(12) United States Patent
Asai et al.

(10) Patent No.: US 11,746,704 B2
(45) Date of Patent: Sep. 5, 2023

(54) GAS TURBINE COMBUSTOR AND ITS OPERATING METHOD

(71) Applicant: Mitsubishi Heavy Industries, Ltd., Tokyo (JP)

(72) Inventors: Tomohiro Asai, Tokyo (JP); Shohei Yoshida, Yokohama (JP); Yoshitaka Hirata, Yokohama (JP); Akinori Hayashi, Yokohama (JP); Yasuhiro Akiyama, Yokohama (JP); Yoshinori Matsubara, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 17/036,999

(22) Filed: Sep. 29, 2020

(65) Prior Publication Data

US 2021/0095599 A1 Apr. 1, 2021

(30) Foreign Application Priority Data

Oct. 1, 2019 (JP) .................................. 2019-181129

(51) Int. Cl.
*F02C 7/228* (2006.01)
*F02C 9/26* (2006.01)
(Continued)

(52) U.S. Cl.
CPC .............. *F02C 7/228* (2013.01); *F02C 9/263* (2013.01); *F02C 9/40* (2013.01); *F23N 1/002* (2013.01);
(Continued)

(58) Field of Classification Search
CPC combination set(s) only.
See application file for complete search history.

(56) References Cited

U.S. PATENT DOCUMENTS

2006/0016198 A1  1/2006  Stuttaford et al.
2011/0036092 A1*  2/2011  Lawson ................... F23R 3/36
                                                  60/734
(Continued)

FOREIGN PATENT DOCUMENTS

JP    2003-148734 A    5/2003
JP    2010-133339 A    6/2010
(Continued)

OTHER PUBLICATIONS

Japanese-language Office Action issued in Japanese Application No. 2019-181129 dated Oct. 25, 2022 with English translation (10 pages).

*Primary Examiner* — Gerald L Sung
*Assistant Examiner* — Jacek Lisowski
(74) *Attorney, Agent, or Firm* — Crowell & Moring LLP

(57) ABSTRACT

A hydrogen content fuel can be stably ignited using a gaseous fuel that does not contain hydrogen and dispersibility of the hydrogen content fuel is enhanced.

A gas turbine combustor including a burner including: a startup fuel pipe in which a startup fuel circulates; a first main fuel pipe in which a main fuel circulates, a second main fuel pipe in which the main fuel circulates; a fuel mixer to which the startup fuel pipe and the first main fuel pipe are connected; an inner fuel nozzle to which the fuel mixer is connected; a plurality of outer fuel nozzles to which the second main fuel pipe is connected; a startup fuel control valve provided in the startup fuel pipe; a first fuel control valve provided in the first main fuel pipe; and a second fuel control valve provided in the second main fuel pipe.

14 Claims, 14 Drawing Sheets

(51) Int. Cl.
*F02C 9/40* (2006.01)
*F23R 3/36* (2006.01)
*F23N 1/00* (2006.01)

(52) U.S. Cl.
CPC ............ *F23R 3/36* (2013.01); *F05D 2240/35* (2013.01); *F05D 2270/082* (2013.01); *F23D 2900/00014* (2013.01); *F23N 2237/02* (2020.01); *F23N 2241/20* (2020.01)

(56) References Cited

U.S. PATENT DOCUMENTS

| | | | |
|---|---|---|---|
| 2013/0227928 A1 | 9/2013 | Uhm et al. | |
| 2017/0284671 A1* | 10/2017 | Asai | F23R 3/34 |
| 2018/0112604 A1* | 4/2018 | Akiyama | F23R 3/283 |

FOREIGN PATENT DOCUMENTS

| | | |
|---|---|---|
| JP | 2013-181744 A | 9/2013 |
| JP | 2014-55697 A | 3/2014 |
| JP | 2014-105601 A | 6/2014 |
| JP | 2016-75448 A | 5/2016 |
| JP | 2018-71354 A | 5/2018 |

* cited by examiner

GAS TURBINE COMBUSTOR AND ITS OPERATING METHOD

BACKGROUND OF THE INVENTION

1. Field of the Invention

The present invention relates to a gas turbine combustor and its operating method.

2. Description of the Related Art

In recent years, it has been required to make effective use of byproduct gas such as coke oven gas produced as byproducts in iron works and off-gas produced as byproducts in oil refineries from the viewpoint of mitigation of global warming, utilization of natural resources, and reduction of power generation cost. Furthermore, attention has been paid to an integrated coal gasification combined cycle (IGCC) gasifying coal that is plentiful resources and generating electric power. In the IGCC, measures for reducing carbon dioxide ($CO_2$) emissions by a system (carbon capture and storage (CCS)) that captures and stores carbon in a gaseous fuel supplied to a gas turbine are under consideration. Since the gaseous fuel mainly contains hydrogen ($H_2$), it is possible to reduce $CO_2$ emissions and contribute to mitigation of global warming, compared with natural gas (mainly containing methane) normally used in gas turbines. Moreover, power generation by a pure hydrogen fuel is under consideration for realization of a future hydrogen-based society. If electric power can be generated using pure hydrogen as a fuel, zero-emission power generation without $CO_2$ emissions can be realized. In this way, a hydrogen content fuel is regarded as being promising from the viewpoint of the mitigation of global warming, the utilization of natural resources, and the reduction of power generation cost.

However, burning hydrogen results in a local increase in a maximum adiabatic flame temperature of a combustion zone, compared with a case of burning natural gas; thus, there is a concern of an increase in emissions of nitrogen oxides (NOx) that is an environmental pollutant in combustion gas. Furthermore, because of a higher burning velocity of hydrogen than that of natural gas, flashback of a flame to a burner section upstream of a combustor possibly occurs, which arouses a concern of a reduction in reliability of the combustor. To address the problems, there is known a lean combustion type combustor intended to reduce NOx emissions and prevent flashback of a flame by enhancing fuel dispersibility and preventing local formation of a high-temperature flame (Patent Document 1: JP-2003-148734-A, etc.) and the like). The combustor of this type is configured with, for example, an air hole plate having a plurality of air holes and a plurality of fuel nozzles, injects a fuel from each fuel nozzle to the corresponding air hole, and supplies a coaxial jet formed from a fuel stream and an air flow surrounding this fuel stream to a combustion chamber.

In a case of using a hydrogen content fuel as a fuel of a gas turbine, there is a concern that when ignition fails within the combustor, an unburned hydrogen content fuel is emitted from the combustor, stagnates in the turbine, and is burned in the turbine. To take measures against the problem, there is known an operating method of supplying a hydrogen content fuel after ignition of a startup fuel that does not contain hydrogen. As one type of the operating method, there is known an example of igniting an oil fuel and changing over the oil fuel to a hydrogen content fuel (Patent Document 2: JP-2014-105601-A and Patent Document 3: JP-2018-71354-A). There is also known an example of co-firing for making use of part of a plurality of main burners with natural gas and a remainder thereof with a hydrogen content fuel after igniting a pilot burner disposed at a center with the natural gas (Patent Document 4: JP-2016-75448-A).

CITATION LIST

Patent Documents

Patent Document 1: JP-2003-148734-A
Patent Document 2: JP-2014-105601-A
Patent Document 3: JP-2018-71354-A
Patent Document 4: JP-2016-75448-A In JP-2014-105601-A, JP-2018-71354-A, and JP-2016-75448-A, it is impossible to inject the hydrogen content fuel from fuel nozzles used in injection of a startup fuel. Owing to this, if a firing operation transitions to an operation of single firing of the hydrogen content fuel, then it is impossible to supply the fuel to fuel injection zones of the fuel nozzles for the startup fuel, and dispersibility of a gaseous fuel deteriorates, resulting in a disadvantage in terms of NOx emissions reduction.

An object of the present invention is to provide a gas turbine combustor and its operating method that can stably ignite a hydrogen content fuel using a gaseous fuel that does not contain hydrogen and enhance dispersibility of the hydrogen content fuel.

SUMMARY OF THE INVENTION

To attain the object, the present invention provides a gas turbine combustor including a burner including: a startup fuel pipe in which a startup fuel circulates; a first main fuel pipe in which a main fuel circulates, a second main fuel pipe in which the main fuel circulates; a fuel mixer to which the startup fuel pipe and the first main fuel pipe are connected; an inner fuel nozzle to which the fuel mixer is connected; a plurality of outer fuel nozzles to which the second main fuel pipe is connected; a startup fuel control valve provided in the startup fuel pipe; a first fuel control valve provided in the first main fuel pipe; and a second fuel control valve provided in the second main fuel pipe.

According to the present invention, it is possible to stably ignite a hydrogen content fuel using a gaseous fuel that does not contain hydrogen and enhance dispersibility of the hydrogen content fuel.

DESCRIPTION OF THE PREFERRED EMBODIMENTS

Embodiments of the present invention will be described hereinafter with reference to the drawings.

First Embodiment

—Gas Turbine Plant—

Figure 1:
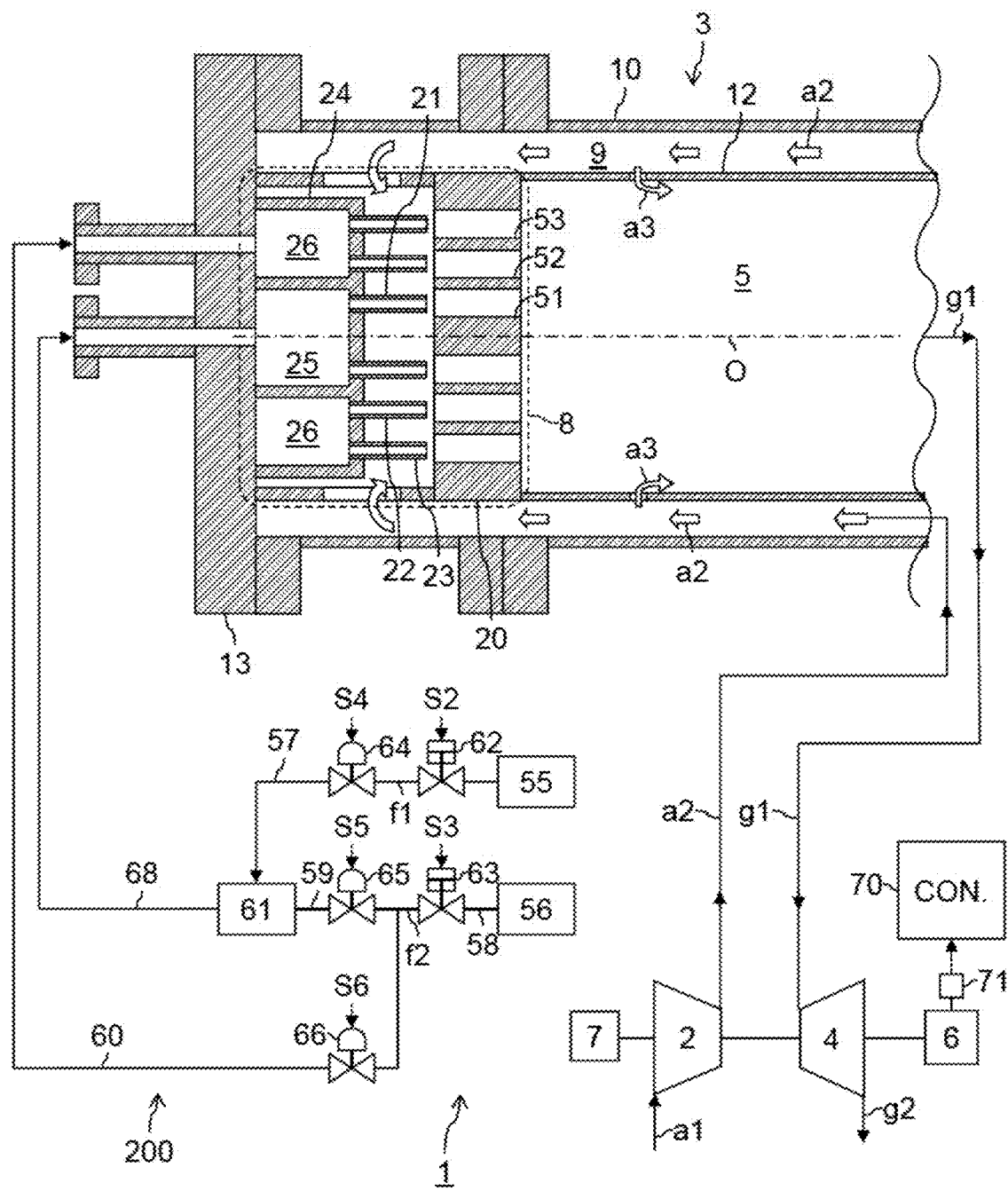
FIG. 1 is a schematic configuration diagram of a gas turbine plant configured with a gas turbine combustor according to a first embodiment of the present invention.
Figure 2:
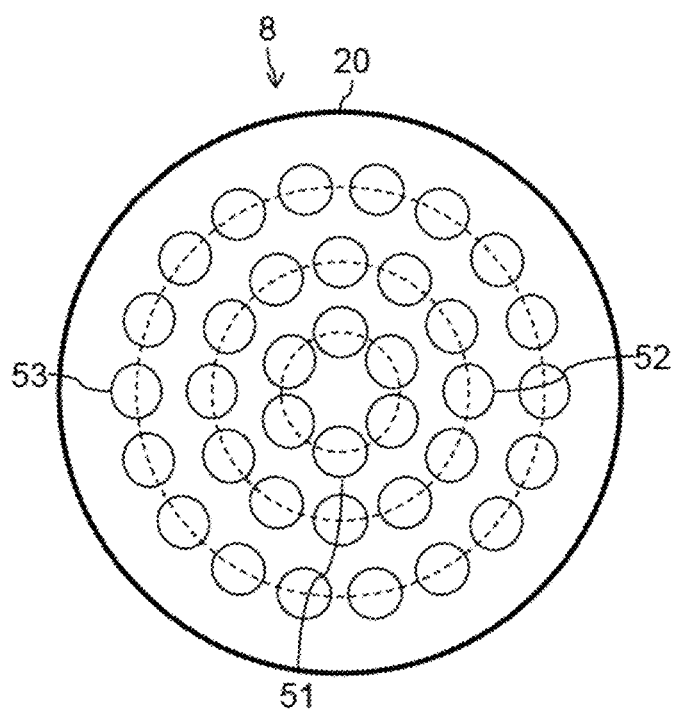
FIG. 2 depicts a burner provided in the gas turbine combustor according to the first embodiment of the present invention, the burner being viewed from a combustion chamber.

FIG. 1 is a schematic configuration diagram of a gas turbine plant configured with a gas turbine combustor according to a first embodiment of the present invention. FIG. 2 depicts a burner provided in the gas turbine combustor according to the first embodiment of the present invention, the burner being viewed from a combustion chamber.

A gas turbine plant 1 is configured with an air compressor 2, a gas turbine combustor (hereinafter, abbreviated as "combustor") 3, a turbine 4, and an electric generator 6. The air compressor 2 draws in and compresses air a1, and supplies compressed air a2 to the combustor 3. The combustor 3 mixes up and burns the compressed air a2 and a gaseous fuel (a startup fuel f1 and a main fuel f2) to produce combustion gas g1. The turbine 4 is driven by the combustion gas g1 generated in the combustor 3, and the combustion gas g1 driving the turbine 4 is evolved as exhaust gas g2. The electric generator 6 is driven by rotational power of the turbine 4 and generates electric power. It is noted that the turbine 4 is driven by a startup motor 7 only at a time of beginning of startup.

—Gas Turbine Combustor—

The combustor 3 is attached to a casing (not depicted) of the turbine 4, and configured with a liner (combustion liner) 12, a flow sleeve (outer casing) 10, a burner 8, and a fuel supplying system 200. The liner 12 is a cylindrical member and forms a combustion chamber 5 there inside. The flow sleeve 10 is a cylindrical member having a larger inside diameter than an inside diameter of the liner 12 and surrounding an outer circumference of the liner 12 to form a cylindrical air flow passage 9. An end portion of the flow sleeve 10 on an opposite side (a left side in FIG. 1) to the turbine 4 is closed by an end cover 13. The compressed air a2 from the air compressor 2 circulates in the air flow passage 9 formed on the outer circumference of the liner 12 by the flow sleeve 10 in a direction away from the turbine 4, and an outer circumferential surface of the liner 12 is subjected to convection cooling by the compressed air a2 flowing in the air flow passage 9. In addition, many holes are formed in a wall surface of the liner 12, partial compressed air a3 of the compressed air a2 flowing in the air flow passage 9 flows into the combustion chamber 5 through those holes, and the inner circumferential surface of the liner 12 is subjected to film cooling by the partial compressed air a3. Furthermore, the compressed air a2 passing through the air flow passage 9 and arriving at the burner 8 is jetted together with the gaseous fuel supplied from the fuel supplying system 200 to the burner 8, and the gaseous fuel jetted together with the compressed air a2 is burned. In the combustion chamber 5, a mixed gaseous fuel of the compressed air a2 and the gaseous fuel is burned to produce the combustion gas g1, and the combustion gas g1 is supplied to the turbine 4 via a transition piece (not depicted).

As depicted in FIG. 1, only one burner 8 is disposed at an inlet port of the liner 12 (opening in the end portion on the opposite side to the turbine 4), and configured with an air hole plate 20, fuel nozzles 21 to 23, and a fuel distributor (fuel header) 24.

The air hole plate 20 is a circular plate coaxial with the liner 12 and disposed at the inlet port of the liner 12 (opening in the end portion on the opposite side to the turbine 4). The air hole plate 20 is configured with a plurality of air holes 51 to 53 that guide the compressed air a2 to the combustion chamber 5. The plurality of air holes 51 to 53 configure a plurality of concentric annular rows around a central axis O of the liner 12. The air holes belonging to a first (innermost) row are the air holes 51, those belonging to a second annular row are the air holes 52, and those belonging to a third (outermost) annular row are the air holes 53. The air holes 51 configure inner air holes, while the air holes 52 and 53 configure outer air holes. In the present embodiment, the air holes 51 to 53 have swivel corners and an outlet port of each air hole is misaligned to one circumferential side with respect to an inlet port thereof.

The fuel nozzles 21 to 23 are supported by the fuel distributor 24 and disposed opposite to the combustion chamber 5 across the air hole plate 20. The fuel nozzles 21 to 23 correspond to the air holes 51 to 53 in numbers and positions (one fuel nozzle corresponds to one air hole), and configure, together with the air holes 51 to 53, the plurality of concentric annular rows around the central axis O of the liner 12. The fuel nozzles belonging to the first (innermost) annular row are the fuel nozzles 21, those belonging to the second annular row are the fuel nozzles 22, and those belonging to the third (outermost) annular row are the fuel nozzles 23. The fuel nozzles 21 configure inner fuel nozzles, while the fuel nozzles 22 and 23 configure outer fuel nozzles. The fuel nozzles 21 to 23 have injection ports oriented to the inlet ports of the corresponding air holes, and inject the gaseous fuel toward the corresponding air holes. By injecting the fuel from many fuel nozzles toward the corresponding air holes in this way, a coaxial jet of the fuel and the air in which surroundings of a fuel stream are covered with an air stream is dispersed in and injected to the combustion chamber 5 from each air hole.

It is noted that the numbers of fuel nozzles and air holes of the outer annular row are larger due to a difference in a circumference of a circle among the annular rows. In other words, the numbers of the fuel nozzles 21 and the air holes 51 (each six in the example of FIG. 2) in the first (innermost) row are smaller than those of the fuel nozzles 22 and the air holes 52 (each 12 in the example of FIG. 2) in the second row. The numbers of the fuel nozzles 22 and the air holes 52 in the second row are smaller than those of the fuel nozzles 23 and the air holes 53 (each 18 in the example of FIG. 2) in the third (outermost) row.

The fuel distributor 24 is a member that distributes and supplies the fuel to the fuel nozzles 21 to 23 and configured with a plurality of fuel cavities 25 and 26 contained inside. Each of the fuel cavities 25 and 26 is a space that plays a role in distributing and supplying the gaseous fuel to a plurality of fuel nozzles belonging to the corresponding annular row. The fuel cavity 25 is formed into a columnar shape on the central axis O of the liner 12, and the fuel cavity 26 is formed into a cylindrical shape in such a manner as to surround an outer circumference of the fuel cavity 25. In the present embodiment, the fuel nozzles 21 are connected to the fuel cavity 25, and the fuel nozzles 22 and 23 are connected to the fuel cavity 26. When being supplied to the fuel cavity 25, the gaseous fuel is distributed to the fuel nozzles 21 disposed in the innermost annular row and is then jetted, and the gaseous fuel that has been jetted from the fuel nozzles 21 is jetted together with the compressed air a2 from the air holes 51 to the combustion chamber 5. When being supplied to the fuel cavity 26, the gaseous fuel is distributed to the fuel nozzles 22 and 23 disposed in the second and third annular rows and is then jetted, and the gaseous fuel that has been jetted from the fuel nozzles 22 and 23 is jetted together with the compressed air a2 from the air holes 52 and 53 to the combustion chamber 5.

The fuel supplying system 200 is configured with fuel supplying sources 55 and 56, a startup fuel pipe 57, a main flow pipe 58, main fuel pipes 59 and 60, a fuel mixer 61, fuel shut valves 62 and 63, and fuel control valves 64 to 66.

The fuel supplying source 55 is a source of supplying the startup fuel f1. As the startup fuel f1, a fuel that does not contain hydrogen or a gaseous fuel with a hydrogen content of a few % (for example, 5%) such as a hydrocarbon fuel is used. Representative examples of the hydrocarbon fuel include natural gas mainly containing methane and petroleum gas mainly containing propane or butane. The fuel supplying source 56 is a source of supplying the main fuel f2. As the main fuel f2, a hydrogen content fuel with a hydrogen content of a few % (for example, 5%) to several tens of % or higher such as byproduct gas is used. Pure hydrogen (hydrogen content of 100%) is a kind of the hydrogen content fuel.

The startup fuel pipe 57 extends from the fuel supplying source 55 and the startup fuel f1 circulates in the startup fuel pipe 57. The main flow pipe 58 extending from the fuel supplying source 56 branches off to the first main fuel pipe 59 and the second main fuel pipe 60, and the main fuel f2 circulates in these main fuel pipes 59 and 60. The startup fuel pipe 57 and the first main fuel pipe 59 are connected to the fuel mixer 61 and merge together. The fuel mixer 61 is connected to the fuel cavity 25 via a communication duct 68, and connected to the inner fuel nozzles 21 via the fuel cavity 25. The second main fuel pipe 60 is connected to the fuel cavity 26, and connected to the outer fuel nozzles 22 and 23 via the fuel cavity 26. The fuel shut valve 62 and the fuel control valve (startup fuel control valve) 64 are provided in the startup fuel pipe 57. In addition, the fuel control valve 65 (first fuel control valve) is provided in the first main fuel pipe 59, and the fuel control valve 66 (second fuel control valve) is provided in the second main fuel pipe 60. The fuel shut valve 63 is provided between a branch portion, in which the main flow pipe 58 branches off to the main fuel pipes 59 and 60, and the fuel supplying source 56 (that is, provided in the main flow pipe 58).

Opening the fuel shut valve 62 enables supply of the startup fuel f1 to the startup fuel pipe 57, and closing the fuel shut valve 62 causes shut-off of the supply of the startup fuel f1 to the startup fuel pipe 57. Opening the fuel shut valve 63 enables supply of the main fuel f2 to the main fuel pipes 59 and 60, and closing the fuel shut valve 63 causes shut-off of the supply of the main fuel f2 to the main fuel pipes 59 and 60. The fuel control valves 64 to 66 each play a role in regulating a flow rate of the fuel in response to an opening degree, and can shut off a stream of the fuel by being set into a fully closed state.

For example, releasing the fuel shut valve 62, closing the fuel shut valve 63, and raising the opening degree of the fuel control valve 64 from the fully closed state cause an increase in a supply flow rate of the startup fuel f1 to the fuel cavity 25 and only the startup fuel f1 to be jetted from the fuel nozzles 21. Conversely, releasing the fuel shut valve 63, closing the fuel shut valve 62, and raising the opening degree of the fuel control valve 65 from the fully closed state cause an increase in a supply flow rate of the main fuel f2 to the fuel cavity 25 and only the main fuel f2 to be jetted from the fuel nozzles 21. Furthermore, releasing both the fuel shut valves 62 and 63 and raising the opening degrees of the fuel control valves 64 and 65 from the fully closed states cause the startup fuel f1 and the main fuel f2 to be mixed up in the fuel mixer 61 and a mixed gaseous fuel of the two fuels to be jetted from the fuel nozzles 21 via the fuel cavity 25. Moreover, raising the opening degree of the fuel control valve 66 from the fully closed state in a state of releasing the fuel shut valve 63 causes an increase in the supply flow rate of the main fuel f2 to the fuel cavity 26 and only the main fuel f2 to be jetted from the fuel nozzles 22 and 23.

While a case in which the number of annular rows of air holes is three is exemplarily illustrated in the present embodiment, the number of annular rows of air holes may be two or may be equal to or greater than four. Increasing the number of rows enables the combustor 3 to be compatible with a large-capacity gas turbine and improvement in operation controllability.

Furthermore, the combustor 3 is equipped with a controller 70 controlling the fuel shut valves 62 and 63 and the fuel control valves 64 to 66. The controller 70 controls the fuel shut valves 62 and 63 and the fuel control valves 64 to 66 on the basis of a gas turbine load detected by a sensor 71. In the present embodiment, output electric power from the electric generator 6 or a rotation speed of the turbine 4 is measured as the gas turbine load, and a power meter or a rotation sensor can be used as the sensor 71. Moreover, because of a proportional relationship between the gas turbine load and a flow rate of the fuel, a flowmeter measuring a supply flow rate of the fuel or an opening meter measuring the opening degrees of the fuel control valves 64 to 66 can be used as the sensor 71.

The controller 70 is a computer and configured with an input interface, a read only memory (ROM) such as an erasable programmable read only memory (EPROM), a random access memory (RAM), a central processing unit (CPU), a timer, an output interface, and the like. A detection signal output from the sensor 71 and an operation signal output from an input device (not depicted) in response to an operator's operation are input to the input interface. The ROM stores computing equations, programs, and data necessary for an operation of the gas turbine plant 1 including the combustor 3. The RAM stores, for example, numerical values in the middle of computing and data input from the input device. The output interface outputs command signals to the fuel shut valves 62 and 63, the fuel control valves 64 to 66, and the other actuating device such as an inlet guide vane (IGV) provided in the gas turbine plant 1 in response to commands from the CPU.

The CPU executes control over the fuel shut valves 62 and 63, the fuel control valves 64 to 66, and the like on the basis of the data input via the input interface in accordance with the programs loaded from the ROM.

—Operations—

An operating method of the combustor 3 according to the present embodiment will be described hereinafter. The operating method described hereinafter is automatically executed by the controller 70 in response to the gas turbine load detected by the sensor 71. Alternatively, an operator can execute the operating method by a manual operation as appropriate while monitoring the gas turbine load. Flow rates of the startup fuel f1 and the main fuel f2 are determined on the basis of the gas turbine load such as the output electric power, and the opening degrees of the fuel control valves 64, 65, and 66 are controlled in such a manner as to supply the fuels at the flow rates in response to the gas turbine load.

Figure 3:
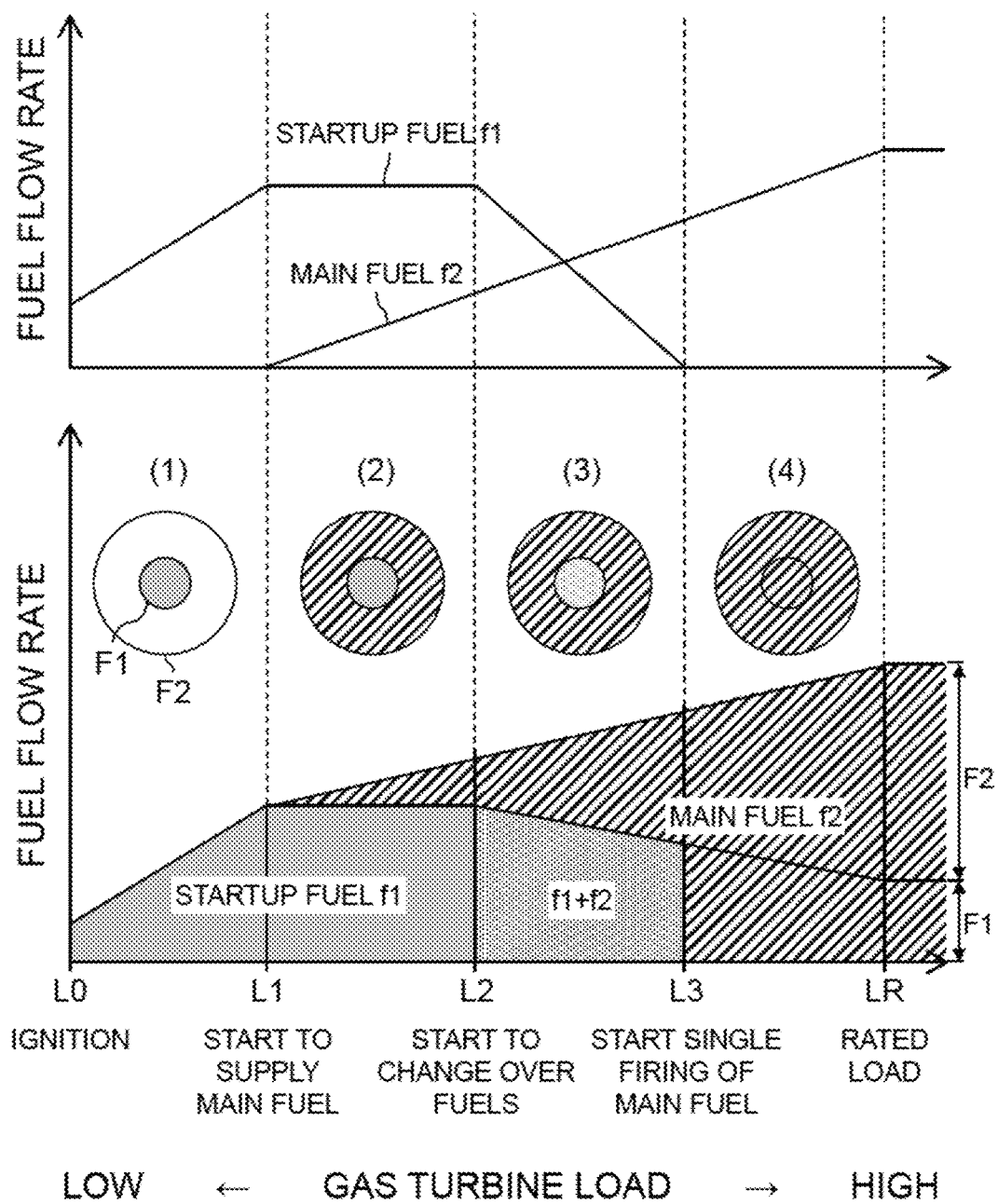
FIG. 3 is an explanatory diagram of a gas turbine combustor operating method (startup time) according to the first embodiment of the present invention.

FIG. 3 is an explanatory diagram of the combustor operating method (startup time) according to the first embodiment. An example of the operating method at a startup time since ignition of the startup fuel f1 until transition to a state of single firing of the main fuel f2 will be described with reference to FIG. 3. In FIG. 3, a horizontal axis represents the gas turbine load and the gas turbine load is heavier as being closer to a right side. Furthermore, an upper row of FIG. 3 depicts changes in the flow rates of the startup fuel f1 and the main fuel f2, and a lower row thereof depicts a change in a flow rate of the gaseous fuel supplied to the inner fuel nozzles 21 and the outer fuel nozzles 22 and 23 along with burner schematic diagrams. An inner burner F1 depicted in the burner schematic diagrams is an inner circumferential side circular burner configured with the fuel nozzles 21, and an outer burner F2 is an outer circumferential side toroidal burner configured with the fuel nozzles 22 and 23.

In the present embodiment, the controller 70 or the operator executes the following four procedures (1) to (4) in a sequential order to perform operations from ignition to a rated load.

(1) Supply the startup fuel f1 to the fuel nozzles 21 (inner burner F1) in a state of not supplying the fuel to the fuel nozzles 22 and 23 (outer burner F2).

(2) Supply the main fuel f2 to the fuel nozzles 22 and 23 in a state of continuing to supply the startup fuel f1 to the fuel nozzles 21 (inner burner F1).

(3) Start to supply the main fuel f2 to the fuel nozzles (inner burner F1) while continuing to supply the main fuel f2 to the fuel nozzles 22 and 23 (outer burner F2), and change over the fuel supplied to the fuel nozzles 21 from the startup fuel f1 to the mixed gaseous fuel of the startup fuel f1 and the main fuel f2.

(4) Stop to supply the startup fuel f1 to the fuel nozzles 21 (inner burner F1) and supply only the main fuel f2 to all the fuel nozzles 21 to 23 (both of the inner burner F1 and the outer burner F2).

Fuel supply states in the procedures (1) to (4) correspond to burner schematic diagrams (1) to (4) of the same numbers represented in the lower row of FIG. 3, respectively. Operations of the valves in the procedures (1) to (4) will be described.

Procedure (1)

The startup motor 7 starts to rotate a gas turbine rotor, and the controller 70 executes the procedure (1) when the gas turbine load (for example, the rotation speed of the turbine 4 or the output electric power from the electric generator 6) rises up to a set value L0 that satisfies an ignitable condition. In the procedure (1), the controller 70 outputs signals S2 and S4 (FIG. 1) to the fuel shut valve 62 and the fuel control valve 64, and releases the fuel shut valve 62 and opens the fuel control valve 64 to raise the opening degree of the fuel control valve 64 at, for example, a specified increasing rate. The startup fuel f1 is thereby jetted from the fuel nozzles 21 of the inner burner F1 and ignited, the startup fuel f1 increases at a predetermined increasing rate, and the gas turbine load rises. During this time, the controller 70 leaves the fuel shut valve 63 and the fuel control valves 65 and 66 closed. In a case of operator's regulating the fuel flow rates, the operator manually operates the opening degrees of the fuel shut valves 62 and 63 and the fuel control valves 64 to 66 using an operation device (not depicted) as described above.

Procedure (2)

When the gas turbine load rises up to a first set value L1 (>L0), the controller 70 outputs signals S2, S3, S4, and S6 (FIG. 1) to the fuel shut valves 62 and 63 and the fuel control valves 64 to 66 to execute the procedure (2). In the procedure (2), the controller 70 releases the fuel shut valves 62 and 63, and opens the fuel control valve 66 to raise the opening degree of the fuel control valve 66 at, for example, a specified increasing rate while maintaining the opening degree of the fuel control valve 64. The main fuel f2 thereby starts to be jetted from the fuel nozzles 22 and 23 of the outer burner F2 in a state of maintaining an injection quantity of the startup fuel f1 from the fuel nozzles 21 of the inner burner F1, and the main fuel f2 is ignited with a flame formed by the startup fuel f1 as a source of fire. The main fuel f2 further increases at a predetermined increasing rate, and the gas turbine load rises. During this time, the controller 70 leaves the fuel control valve 65 closed. In the case of operator's regulating the fuel flow rates, the operator manually operates the opening degrees of the fuel shut valves 62 and 63 and the fuel control valves 64 to 66 using the operation device (not depicted) as described above.

Procedure (3)

When the gas turbine load rises to a second set value L2 (>L1), the controller 70 outputs the signals S2 to S6 (FIG. 1) to the fuel shut valves 62 and 63 and the fuel control valves 64 to 66 to execute the procedure (3). In the procedure (3), the controller 70 opens the fuel control valve 65 in a state of releasing the fuel shut valves 62 and 63, and lowers the opening degree of the fuel control valve 64 down to zero while increasing the opening degrees of the fuel control valves 65 and 66 at, for example, a specified increasing rate. The mixed gaseous fuel of the startup fuel f1 and the main fuel f2 thereby starts to be jetted from the fuel nozzles 21 of the inner burner F1, a main fuel concentration of the mixed gaseous fuel increases, and an injection quantity of the main fuel f2 from the fuel nozzles 22 and 23 of the outer burner F2 increases. The main fuel f2 starting to be jetted from the fuel nozzles 21 is stably burned together with the startup fuel f1. During this time, the flow rate of the startup fuel f1 decreases but the gas turbine load further rises with the increase of the main fuel f2. In the case of operator's regulating the fuel flow rates, the operator manually operates the opening degrees of the fuel shut valves 62 and 63 and the fuel control valves 64 to 66 using the operation device (not depicted) as described above.

Procedure (4)

The gas turbine load is designed to reach a third set value L3 (>L2) before a supply quantity of the main fuel f2 increases, the opening degree of the fuel control valve 64 falls down to zero, and supply of the startup fuel f1 stops. In other words, when the gas turbine load rises up to the third set value L3, the controller 70 closes the fuel shut valve 62 and the fuel control valve 64 and stops to supply the startup fuel f1 to the inner fuel nozzles 21. A firing state thereby transitions to the state of single firing of the main fuel f2 in which only the main fuel f2 is jetted from all of the inner and outer fuel nozzles 21 to 23. Subsequently, the controller 70 outputs the signals S3, S5, and S6 (FIG. 1) to the fuel shut valve 63 and the fuel control valves 65 and 66, and raises the opening degrees of the fuel control valves 65 and 66 (for example, a total opening area) at, for example, a specified increasing rate in a state of releasing the fuel shut valve 63. As a result, the gas turbine load rises up to a rated value LR and a startup operation is over. In the case of operator's regulating the fuel flow rates, the operator manually operates the opening degrees of the fuel shut valves 62 and 63 and the fuel control valves 64 to 66 using the operation device (not depicted) as described above.

According to this startup method, it is possible to ensure ignition of the main fuel f2 using the flame formed by igniting the startup fuel f1, and stably and smoothly change over from the co-firing of the startup fuel f1 and the main fuel f2 to the single firing of the main fuel f2. It is to be noted that while the case of transitioning the gas turbine load to the rated load in the state of single firing of the main fuel f2 is taken by way of example in the present embodiment, some gas turbine plants transition the gas turbine load to the rated load in the state of co-firing of the startup fuel f1 and the main fuel f2. In that case, the controller 70 can be configured to exercise control to transition the gas turbine load to the rated load by executing the procedure (2) or (3). In this case, it is possible to omit the procedures (3) and (4) or the procedure (4).

Figure 4:
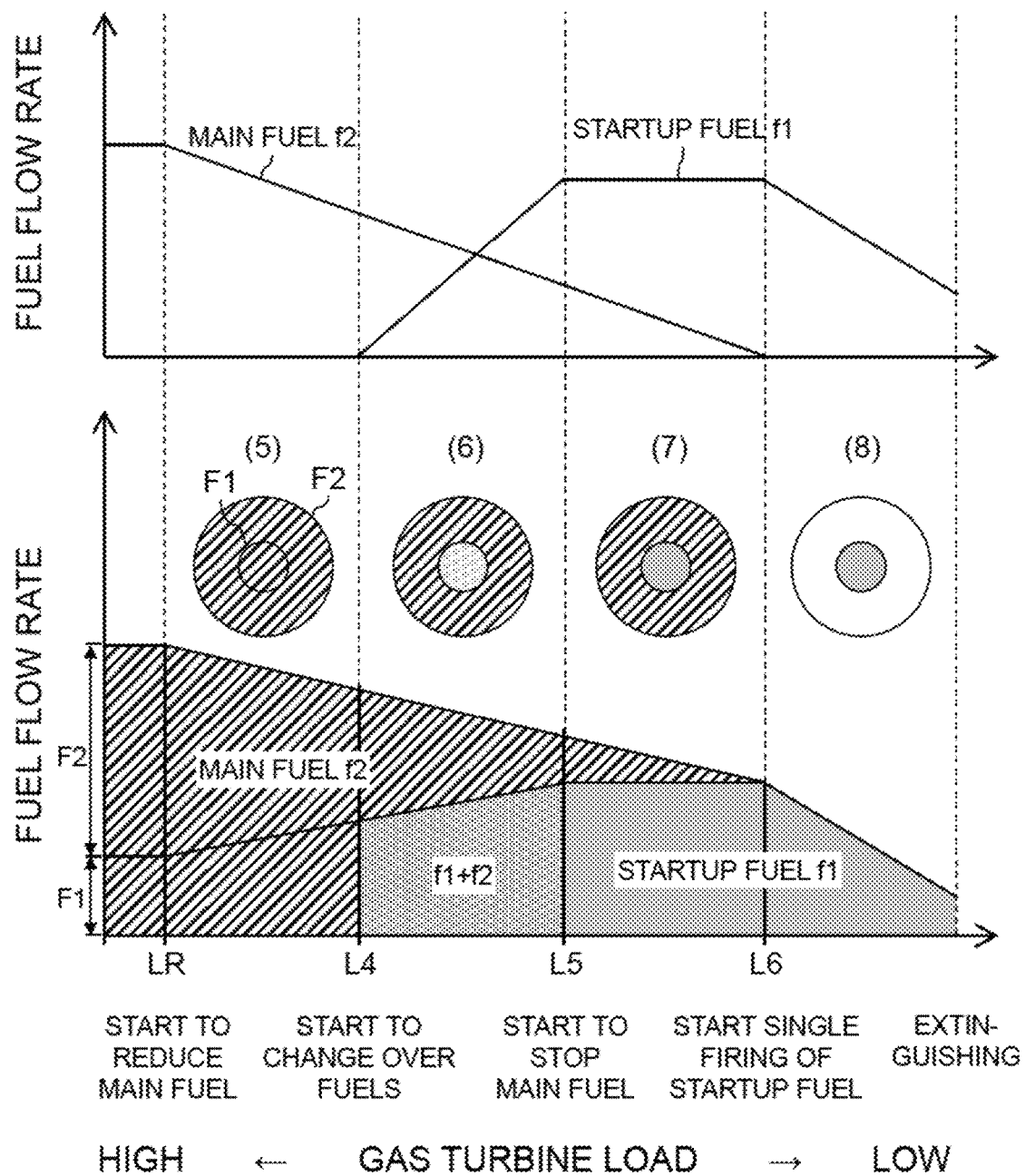
FIG. 4 is an explanatory diagram of a gas turbine combustor operating method (stop time) according to the first embodiment of the present invention.

FIG. 4 is an explanatory diagram of a combustor operating method (stop time) according to the first embodiment. An example of the operating method at a stop time since the state of the single firing of the main fuel f2 until extinguishing will be described with reference to FIG. 4. In FIG. 4, a horizontal axis represents the gas turbine load and the gas turbine load is lighter as being closer to a right side. Furthermore, an upper row of FIG. 4 depicts changes in the flow rates of the startup fuel f1 and the main fuel f2, and a lower row thereof depicts a change in the flow rate of the gaseous fuel supplied to the inner fuel nozzles 21 and the outer fuel nozzles 22 and 23 along with burner schematic diagrams.

In the present embodiment, the controller 70 or the operator executes the following four procedures (5) to (8) in a sequential order to perform operations from the rated load to extinguishing of the fuel.

(5) Lower the supply quantity of the main fuel f2 to the fuel nozzles 22 and 23 (outer burner F2) in a state of supplying only the main fuel f2 to all of the fuel nozzles 21 to 23 (both of the inner burner F1 and the outer burner F2).

(6) Start to supply the startup fuel f1 to the fuel nozzles 21 (inner burner F1) while continuing to supply the main fuel f2 to the fuel nozzles 22 and 23 (outer burner F2), and change over the fuel supplied to the fuel nozzles 21 from the main fuel f2 to the mixed gaseous fuel of the startup fuel f1 and the main fuel f2.

(7) Reduce the supply quantity of the main fuel f2 to the fuel nozzles 22 and 23 (outer burner F2) in a state of stopping to supply the main fuel f2 to the fuel nozzles 21 (inner burner F1) and supplying only the startup fuel f1 to the fuel nozzles 21 (inner burner F1).

(8) Stop to supply the main fuel f2 to the fuel nozzles 22 and 23 (outer burner F2), and reduce the supply flow rate of the startup fuel f1 to the fuel nozzles 21 (inner burner F1) to extinguish the startup fuel f1 while supplying the startup fuel f1 only to the fuel nozzles 21 (inner burner F1).

Fuel supply states in the procedures (5) to (8) correspond to burner schematic diagrams (5) to (8) of the same numbers represented in the lower row of FIG. 4, respectively. Operations of the valves in the procedures (5) to (8) will be described.

Procedure (5)

When a stop signal is input to the controller 70 from the operation device (not depicted), the controller 70 outputs the signals S3, S5, and S6 (FIG. 1) to the fuel shut valve 63 and the fuel control valves 65 and 66 to execute the procedure (5). In the procedure (5), the controller 70 lowers the opening degree of the fuel control valve 66 while raising the opening degree of the fuel control valve 65 in a state of releasing the fuel shut valve 63, and lowers a total supply flow rate of the main fuel f2 at, for example, a specified increasing rate. During this time, the controller 70 leaves the fuel shut valve 62 and the fuel control valve 64 closed. In the case of operator's regulating the fuel flow rates, the operator manually operates the opening degrees of the fuel shut valves 62 and 63 and the fuel control valves 64 to 66 using the operation device (not depicted) as described above.

Procedure (6)

When the gas turbine load lowers from the rated load LR to a fourth set value L4 (<LR), the controller 70 outputs the signals S2 to S6 (FIG. 1) to the fuel shut valves 62 and 63 and the fuel control valves 64 to 66 to execute the procedure (6). In the procedure (6), the controller 70 opens the fuel control valve 64 while lowering the opening degree of the fuel control valve 66 in a state of releasing the fuel shut valves 62 and 63, and lowers the opening degree of the fuel control valve 65 down to zero while increasing the opening degree of the fuel control valve 64 at, for example, a specified increasing rate. The mixed gaseous fuel of the startup fuel f1 and the main fuel f2 thereby starts to be jetted from the fuel nozzles 21 of the inner burner F1, a startup fuel concentration of the mixed gaseous fuel increases and the injection quantity of the main fuel f2 from the fuel nozzles 22 and 23 of the outer burner F2 decreases, and the load falls. A burning velocity falls by start of jetting of the startup fuel f1 from the fuel nozzles 21. In the case of operator's regulating the fuel flow rates, the operator manually operates the opening degrees of the fuel shut valves 62 and 63 and the fuel control valves 64 to 66 using the operation device (not depicted) as described above.

Procedure (7)

When the gas turbine load further falls down to a fifth set value L5 (<L4), the controller 70 outputs the signals S2, S3, S4 and S6 (FIG. 1) to the fuel shut valves 62 and 63 and the fuel control valves 64 and 66 to execute the procedure (7). In the procedure (7), the controller 70 lowers the opening degree of the fuel control valve 66 at, for example, a specified increasing rate while maintaining the opening degree of the fuel control valve 64 in a state of releasing the fuel shut valves 62 and 63. The injection quantity of the main fuel f2 from the fuel nozzles 22 and 23 of the outer burner F2 thereby decreases and the gas turbine load falls in a state of maintaining the injection quantity of the startup fuel f1 from the fuel nozzles 21 of the inner burner F1. During this time, the fuel control valve 65 is closed and supply of the main fuel f2 to the fuel nozzles 21 of the inner burner F1 is stopped, and the firing state is closer to the single firing of the startup fuel f1 with a reduction in the supply quantity of the main fuel f2. In the case of operator's regulating the fuel flow rates, the operator manually operates the opening degrees of the fuel shut valves 62 and 63 and the fuel control valves 64 to 66 using the operation device (not depicted) as described above.

Procedure (8)

The gas turbine load is designed to reach a sixth set value L6 (<L5) before the supply quantity of the main fuel f2 is equal to zero. In other words, when the gas turbine load falls down to the sixth set value L6, the controller 70 closes the fuel shut valve 63 and the fuel control valves 65 and 66 to stop to supply the main fuel f2 to the fuel nozzles 21 to 23. The firing state thereby transitions to the state of the single firing of the startup fuel f1 in which only the startup fuel f1 is jetted from the inner fuel nozzles 21. Subsequently, the controller 70 outputs the signals S2 and S4 (FIG. 1) to the fuel shut valve 62 and the fuel control valve 64, and lowers the opening degree of the fuel control valve 64 to zero at, for example, a specified increasing rate in a state of releasing the fuel shut valve 62. In this course, the burner 8 is extinguished and a stop operation is over. In the case of operator's regulating the fuel flow rates, the operator manually operates the opening degrees of the fuel shut valves 62 and 63 and the fuel control valves 64 to 66 using the operation device (not depicted) as described above.

According to this startup method, the firing state transitions to the state of the single firing of the startup fuel f1 before extinguishing; thus, it is possible to avoid stagnation of the main fuel f2 in the downstream turbine 4 while the main fuel f2 is unburned.

—Advantages—

Figure 5:
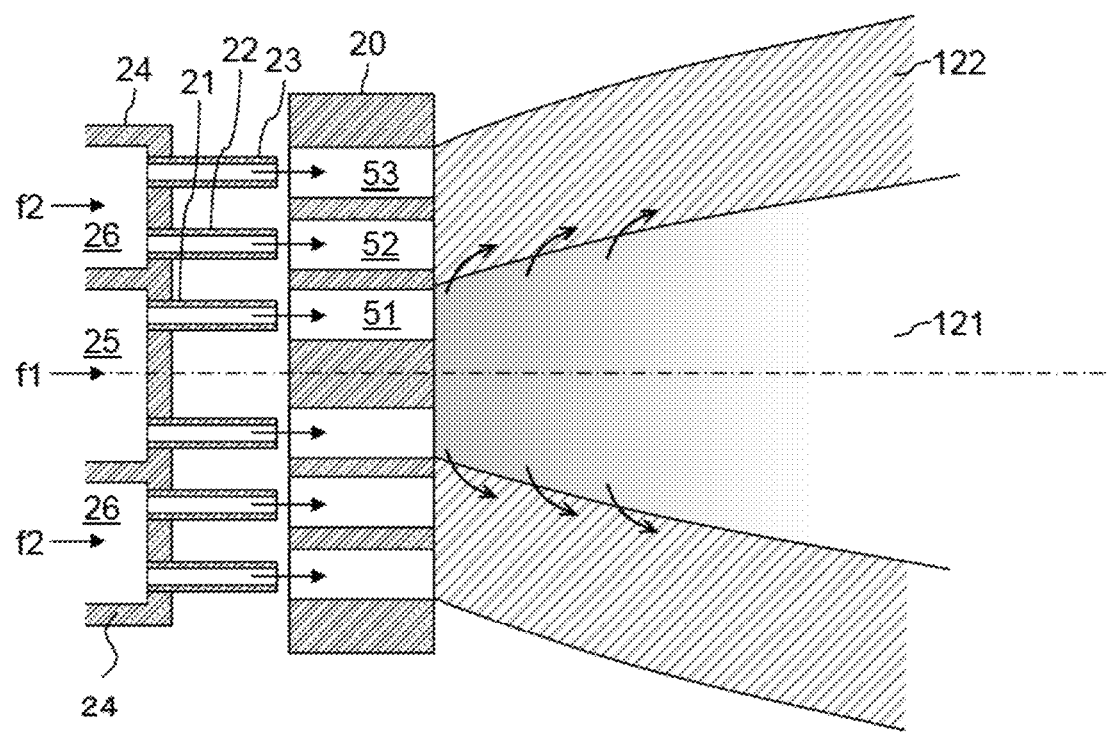
FIG. 5 is an explanatory diagram of advantages of the present invention.

FIG. 5 is an explanatory diagram of advantages of the present invention. In the present embodiment, the startup fuel f1 such as the natural gas is ignited and then the main fuel f2 that is the hydrogen content fuel is supplied, thereby making it possible to ensure ignition of the main fuel f2 to prevent the main fuel f2 from being emitted from the combustor 3 while the main fuel f2 remains unburned. A reason for the above will be described with reference to FIG. 5. FIG. 5 represents an outline of flames formed downstream of the burner. First, the startup fuel f1 is supplied to the inner fuel nozzles 21, and a central flame 121 of the startup fuel f1 is formed in a burner central portion downstream of the inner air holes 51. Next, the main fuel f2 is supplied to the outer fuel nozzles 22 and 23, and the mixed gaseous fuel of the main fuel f2 and the compressed air a2 is jetted from the outer air holes 52 and 53 to the combustion chamber 5. The mixed gaseous fuel containing the main fuel f2 and jetted from the outer air holes 52 and 53 to the combustion chamber 5 is reliably ignited by heat of the previously formed central flame 121, and a surrounding flame 122 by the main fuel f2 is formed around the central flame 121. It is possible to ensure ignition of the main fuel f2 using the previously formed central flame 121 by the startup fuel f1 in this way, and to prevent the main fuel f2 from being emitted from the combustor 3 and stagnating within the downstream turbine 4 while the main fuel f2 remains unburned.

At this time, the fuel mixer 61 to which each of or both of the startup fuel f1 and the main fuel f2 can be supplied is connected to the inner fuel nozzles 21, thereby making it possible to inject the startup fuel f1, the main fuel f2, and the mixed gaseous fuel of the startup fuel f1 and the main fuel f2 from the same fuel nozzles 21 (same injection ports). It is thereby possible to inject the main fuel f2 also from the fuel nozzles 21 (injection ports) used to inject the startup fuel f1 in a case of injecting and igniting the startup fuel f1 and then transitioning a firing operation to an operation of the single firing of the main fuel f2. It is possible to supply the main fuel f2 also to a formation zone of the central flame 121 by the startup fuel f1 and appropriately maintain dispersibility of the gaseous fuel even after transitioning to the state of the single firing of the main fuel f2.

As described so far, according to the present embodiment, it is possible to stably ignite the hydrogen content fuel using the gaseous fuel that does not contain hydrogen and enhance the dispersibility of the hydrogen content fuel. Since a gas turbine power generation plant can be made stable use of by the hydrogen content fuel, it is possible to contribute to mitigation of global warming. Furthermore, since combustion stability can be ensured by making use of byproduct gas produced in an iron works or an oil refinery as the main fuel f2, it is possible to contribute to utilization of natural resources and reduction of power generation cost.

Moreover, since the supply of the main fuel f2 is stopped and the firing state is transitioned to the state of the single firing of the startup fuel f1 before extinguishing, it is possible to prevent flame off before stop of the supply of the main fuel f2 and to avoid stagnation of the main fuel f2 within the downstream turbine 4 while the main fuel f2 remains unburned even in the stop operation.

Second Embodiment

Figure 6:
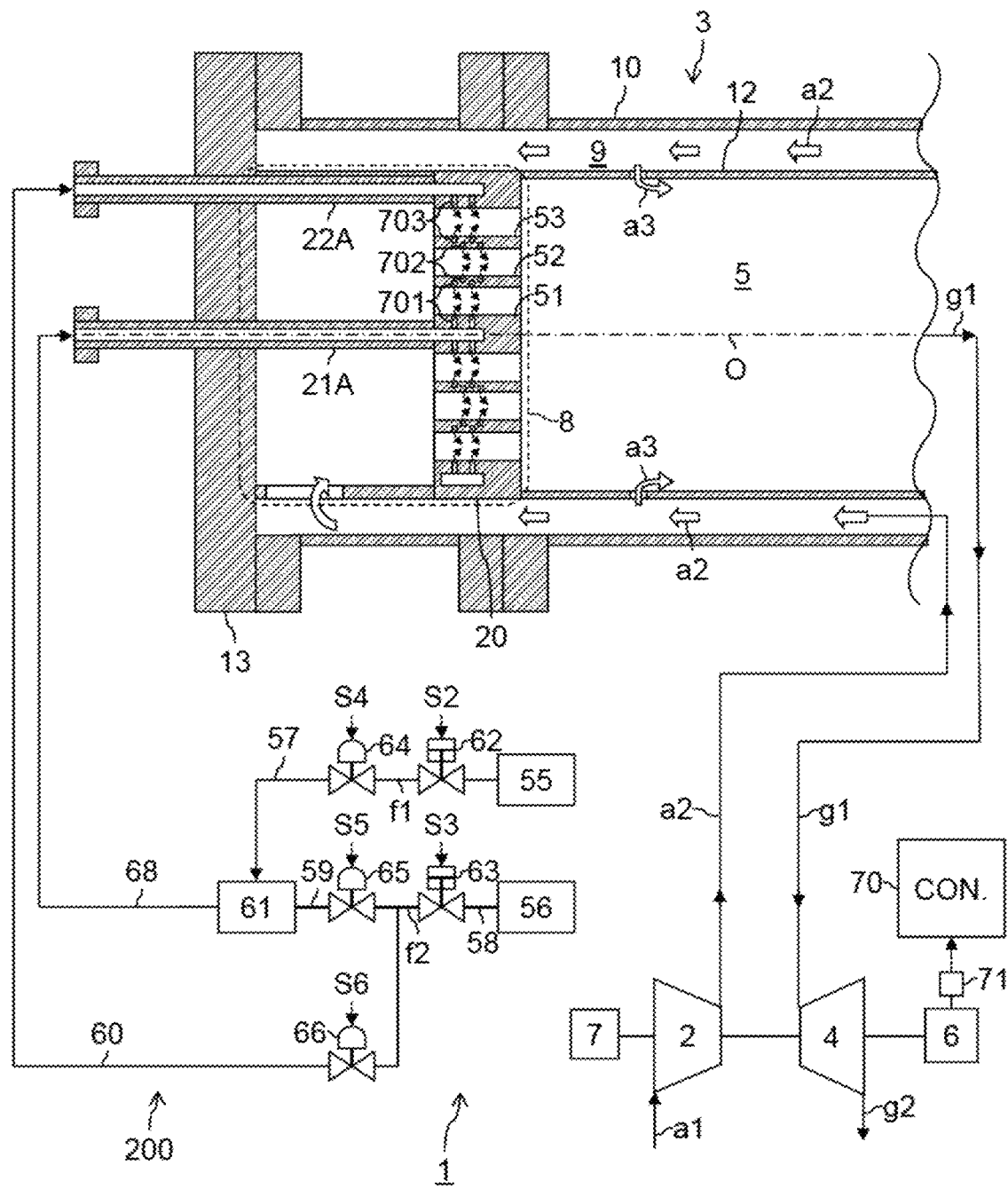
FIG. 6 is a schematic configuration diagram of a gas turbine plant configured with a gas turbine combustor according to a second embodiment of the present invention.

FIG. 6 is a schematic configuration diagram of a gas turbine plant configured with a gas turbine combustor according to a second embodiment. FIG. 6 corresponds to FIG. 1 according to the first embodiment. In FIG. 6, similar elements to those in the first embodiment are denoted by the same reference characters as those in FIG. 1 and description thereof is omitted. The present embodiment differs from the first embodiment in that injection ports of inner fuel nozzles 21A and outer fuel nozzles 22A are open to inner wall surfaces of air holes of the air hole plate 20.

In the present embodiment, injection ports 701 of the fuel nozzles 21A are open to inner walls of the air holes 51, and injection ports 702 and 703 of the fuel nozzles 22A are open to inner walls of the air holes 52 and 53. The communication duct 68 is connected to the fuel nozzles 21A and the main fuel pipe 60 is connected to the fuel nozzles 22A. Other configurations are similar to those according to the first embodiment.

Even with such a lean combustion type burner configuration, it is possible to obtain similar advantages to those of the first embodiment by similarly controlling the fuels.

Third Embodiment

—Configurations—

Figure 7:
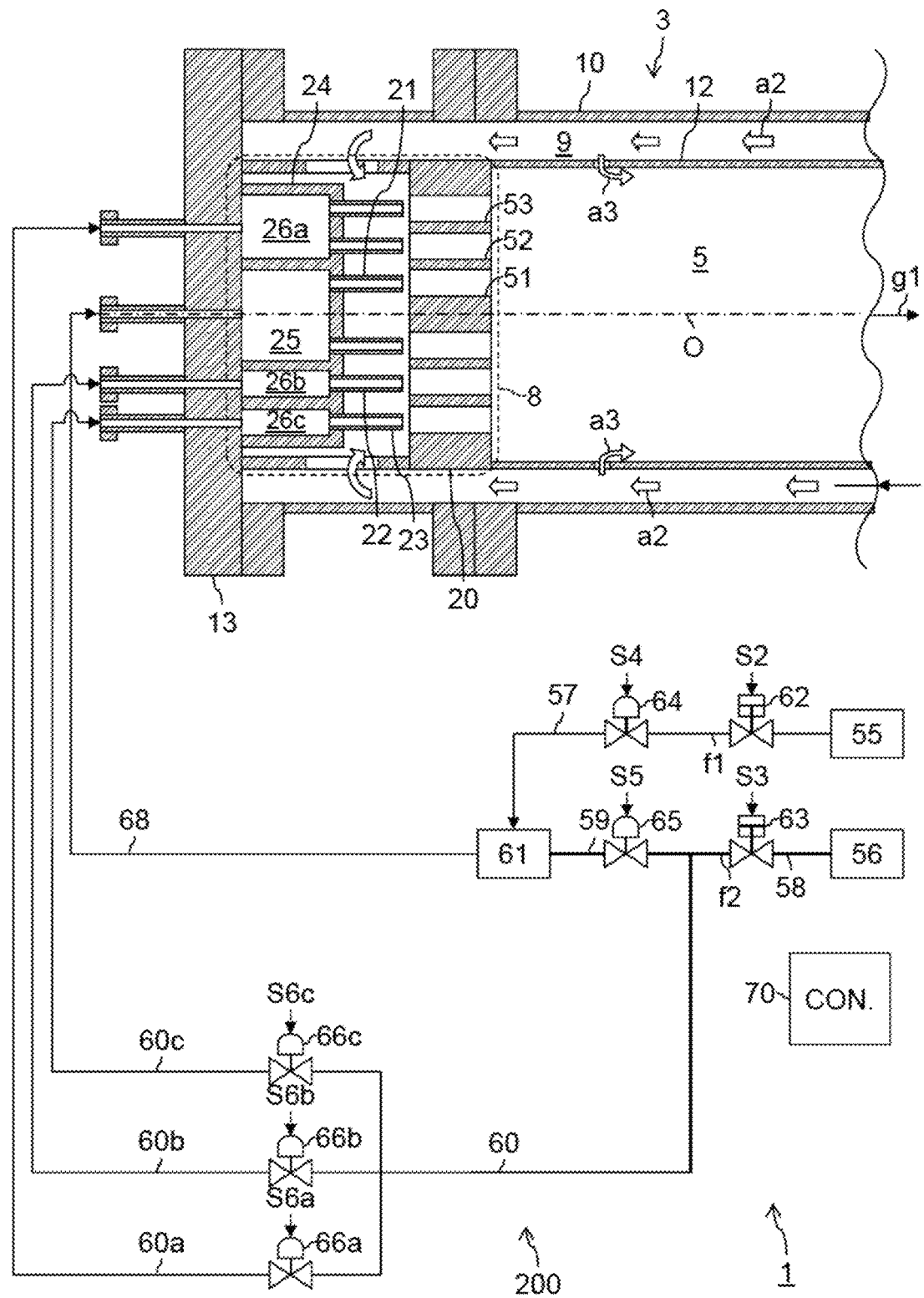
FIG. 7 is a schematic configuration diagram of a gas turbine plant configured with a gas turbine combustor according to a third embodiment of the present invention.
Figure 8:
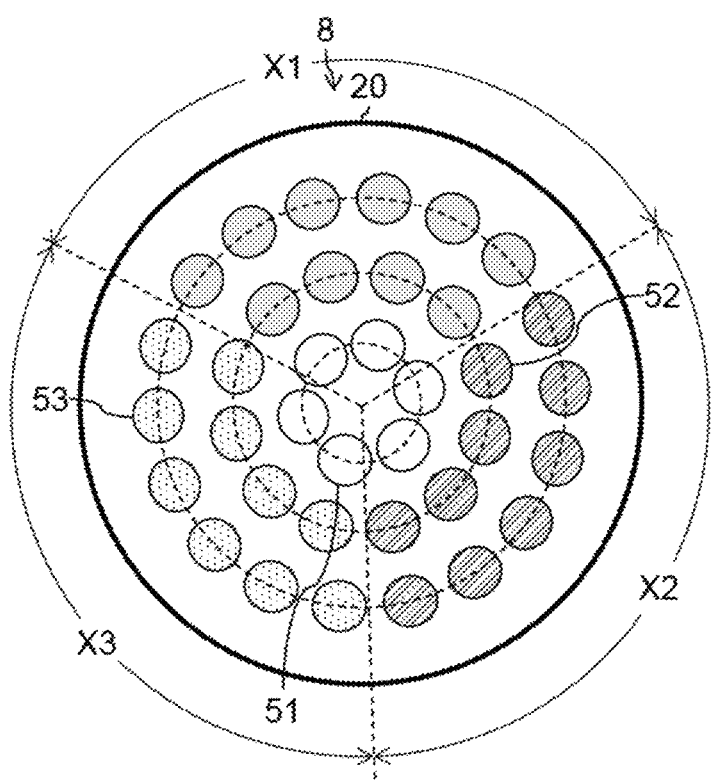
FIG. 8 depicts a burner provided in the gas turbine combustor according to the third embodiment of the present invention, the burner being viewed from a combustion chamber.

FIG. 7 is a schematic configuration diagram of a gas turbine plant configured with a gas turbine combustor according to a third embodiment of the present invention. FIG. 8 depicts a burner provided in the gas turbine combustor according to the third embodiment of the present invention, the burner being viewed from a combustion chamber. FIGS. 7 and 8 correspond to FIGS. 1 and 2 of the first embodiment. In FIGS. 7 and 8, similar elements to those in the first embodiment are denoted by the same reference characters as those in FIG. 1 and description thereof is omitted. The present embodiment differs from the first embodiment in that the outer fuel nozzles 22 and 23 are divided into a plurality of (three in the present embodiment) nozzle groups, and in that the main fuel pipe 60 branches off to a plurality of (three in the present embodiment) pipes that are connected to the corresponding nozzle groups.

In the present embodiment, the outer fuel nozzles 22 and 23 and the air holes 52 and 53 are demarcated into a plurality of zones X1 to X3 in a circumferential direction, and a first nozzle group belongs to the zone X1, a second nozzle group belongs to the zone X2, and a third nozzle group belongs to the zone X3. Furthermore, in the present embodiment, the fuel cavity 26 that distributes the main fuel f2 to the outer fuel nozzles 22 and 23 is also divided into a plurality of (three in the present embodiment) fuel cavities 26a to 26c. The fuel cavity 26a is connected to the fuel nozzles 22 and 23 configuring the first nozzle group. The fuel cavity 26b is connected to the fuel nozzles 22 and 23 configuring the second nozzle group. The fuel cavity 26c is connected to the fuel nozzles 22 and 23 configuring the third nozzle group.

Moreover, in the present embodiment, the main fuel pipe 60 branches off to a plurality of (three in the present embodiment) branch pipes 60a to 60c. The branch pipe 60a is connected to the fuel cavity 26a, the branch pipe 60b is connected to the fuel cavity 26b, and the branch pipe 60c is connected to the fuel cavity 26c. A fuel control valve is not provided in the main fuel pipe 60 (portion before branching off to the branch pipes 60a to 60c). In the present embodiment, a fuel control valve 66a is provided in the branch pipe 60a, a fuel control valve 66b is provided in the branch pipe 60b, and a fuel control valve 66c is provided in the branch pipe 60c. The fuel control valves 66a to 66c are identical to the fuel control valve 66 according to the first embodiment.

The present embodiment is similar to the first embodiment in other respects. It is noted that a burner configured in such a manner that the injection ports of the fuel nozzles are open to the inner wall surfaces of the air holes is also applicable to the present embodiment similarly to the second embodiment. The number of nozzle groups is not limited to three and may be two or more. For example, the number of nozzle groups may be equal to or greater than four or may be two. Increasing the number of nozzle groups enables the combustor 3 to be compatible with a large-capacity gas turbine and improvement in operation controllability. Furthermore, the nozzle groups into which the fuel nozzles 22 and 23 are divided can be set not in the circumferential direction but in a radial direction (that is, as annular rows).

—Operations—

Figure 9:
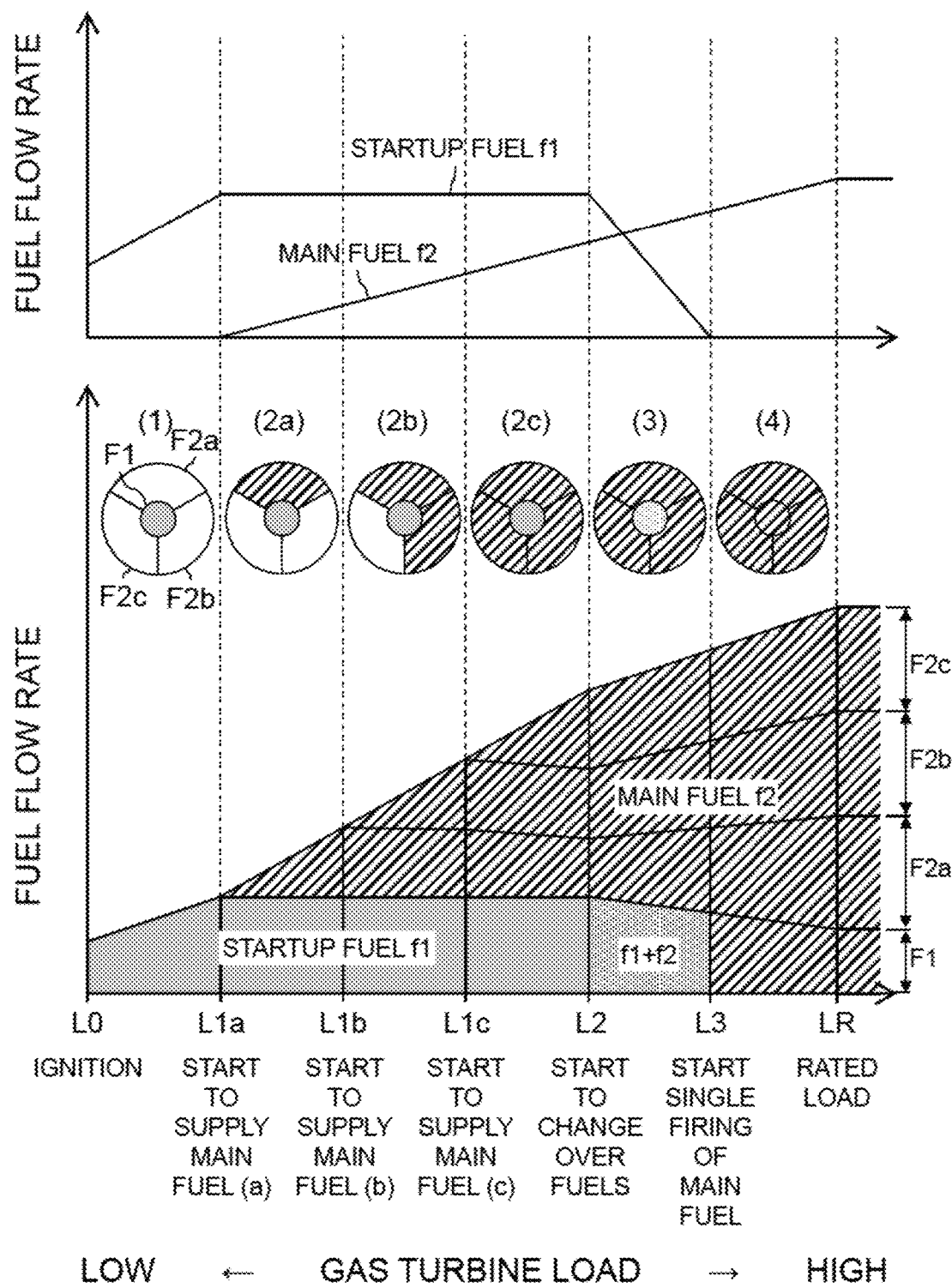
FIG. 9 is an explanatory diagram of a gas turbine combustor operating method (startup time) according to the third embodiment of the present invention.

FIG. 9 is an explanatory diagram of a combustor operating method (startup time) according to the third embodiment. FIG. 9 corresponds to FIG. 3 according to the first embodiment. An example of the operating method at the startup time since ignition of the startup fuel f1 until transition to the state of the single firing of the main fuel f2 will be described with reference to FIG. 9. In FIG. 9, a horizontal axis represents the gas turbine load and the gas turbine load is heavier as being closer to a right side. Furthermore, an upper row of FIG. 9 depicts changes in the flow rates of the startup fuel f1 and the main fuel f2, and a lower row thereof depicts a change in the flow rate of the gaseous fuel supplied to the inner fuel nozzles 21 and the nozzle groups of the outer fuel nozzles 22 and 23 along with burner schematic diagrams. The inner burner F1 depicted in the burner schematic diagrams is the inner circumferential side circular burner configured with the fuel nozzles 21. An outer burner F2a is a fan-shaped burner configured with the fuel nozzles 22 and 23 in the first nozzle group. An outer burner F2b is a fan-shaped burner configured with the fuel nozzles 22 and 23 in the second nozzle group, and an outer burner F2c is a fan-shaped burner configured with the fuel nozzles 22 and 23 in the third nozzle group.

Startup procedures according to the present embodiment are similar to those according to the first embodiment except that the procedure (2) in the four procedures (1) to (4) described in the first embodiment is divided into three stages of procedures (2a) to (2c). In the present embodiment, the procedures (1), (3), and (4) are similar to those according to the first embodiment and description thereof is, therefore, omitted, and the procedures (2a) to (2c) will be described hereinafter. Upon completion of the procedure (1), the following procedures (2a) to (2c) are executed in a sequential order. Upon completion of the procedure (2c), the procedures (3) and (4) are executed similarly to the first embodiment. It is noted that while the three fuel control valves 66a to 66c are provided for the outer burners F2a to F2c in the present embodiment, the fuel control valves 66a to 66c are similarly controlled in the procedures (3) and (4).

Procedure (2a)

When the gas turbine load rises up to a first set value L1a (>L0) after execution of the procedure (1), the controller 70 outputs signals S2, S3, S4, and S6a (FIG. 7) to the fuel shut valves 62 and 63 and the fuel control valves 64 and 66a to execute the procedure (2a). In the procedure (2a), the controller 70 releases the fuel shut valves 62 and 63, and opens the fuel control valve 66a to raise the opening degree of the fuel control valve 66a at, for example, a specified increasing rate while maintaining the opening degree of the fuel control valve 64. The main fuel f2 thereby starts to be jetted from the fuel nozzles 22 and 23 of the outer burner F2a in the state of maintaining the injection quantity of the startup fuel f1 from the fuel nozzles 21 of the inner burner F1, and the main fuel f2 is ignited with the flame formed by the startup fuel f1 as the source of fire. The main fuel f2 further increases at a predetermined increasing rate, and the gas turbine load rises. During this time, the controller 70 leaves the fuel control valves 65, 66b, and 66c closed. In the case of operator's regulating the fuel flow rates, the operator manually operates the opening degrees of the fuel shut valves 62 and 63 and the fuel control valves 64, 65, and 66a to 66c using the operation device (not depicted) as described above.

Procedure (2b)

When the gas turbine load rises up to a set value L1b (>L1a), the controller 70 outputs signals S2, S3, S4, S6a, and S6b (FIG. 7) to the fuel shut valves 62 and 63 and the fuel control valves 64, 66a, and 66b to execute the procedure (2b). In the procedure (2b), the controller 70 releases the fuel shut valves 62 and 63, and newly opens the fuel control valve 66b to raise the opening degree of the fuel control valve 66b at, for example, a specified increasing rate while maintaining the opening degrees of the fuel control valves 64 and 66a. The main fuel f2 starting to be jetted from the fuel nozzles 22 and 23 of the outer burner F2b is thereby smoothly ignited, a supply zone of the main fuel f2 expands and the supply quantity of the main fuel f2 further increases, and the gas turbine load rises. During this time, the controller 70 leaves the fuel control valves 65 and 66c closed. In the case of operator's regulating the fuel flow rates, the operator manually operates the opening degrees of the fuel shut valves 62 and 63 and the fuel control valves 64, 65, and 66a to 66c using the operation device (not depicted) as described above.

Procedure (2c)

When the gas turbine load rises up to a set value L1c (L1b<L1c<L2), the controller 70 outputs signals S2, S3, S4, S6a to S6c (FIG. 7) to the fuel shut valves 62 and 63 and the fuel control valves 64, 66a to 66c to execute the procedure (2c). In the procedure (2c), the controller 70 releases the fuel shut valves 62 and 63, and newly opens the fuel control valve 66c to raise the opening degree of the fuel control valve 66c at, for example, a specified increasing rate while maintaining the opening degrees of the fuel control valves 64, 66a, and 66b. The main fuel f2 starting to be jetted from the fuel nozzles 22 and 23 of the outer burner F2c is thereby smoothly ignited, the supply zone of the main fuel f2 expands and the supply quantity of the main fuel f2 further increases, and the gas turbine load rises. During this time, the controller 70 leaves the fuel control valve 65 closed. In the case of operator's regulating the fuel flow rates, the operator manually operates the opening degrees of the fuel shut valves 62 and 63 and the fuel control valves 64, 65, and 66a to 66c using the operation device (not depicted) as described above.

Figure 10:
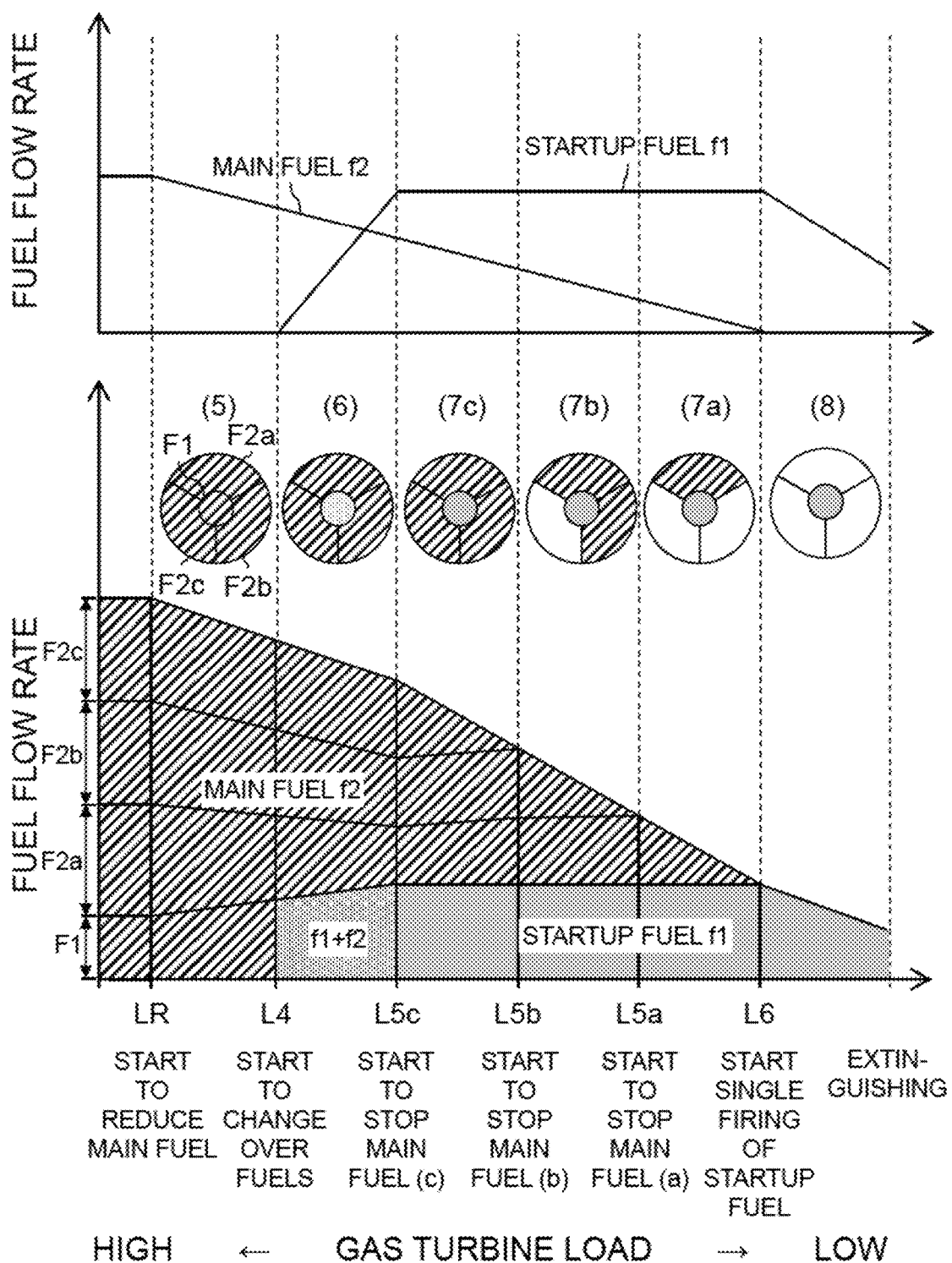
FIG. 10 is an explanatory diagram of a gas turbine combustor operating method (stop time) according to the third embodiment of the present invention.

FIG. 10 is an explanatory diagram of a combustor operating method (stop time) according to the third embodiment. FIG. 10 corresponds to FIG. 4 according to the first embodiment. An example of the operating method at the stop time since the state of the single firing of the main fuel f2 until extinguishing will be described with reference to FIG. 10. In FIG. 10, a horizontal axis represents the gas turbine load and the gas turbine load is lighter as being closer to a right side. Furthermore, an upper row of FIG. 10 depicts changes in the flow rates of the startup fuel f1 and the main fuel f2, and a lower row thereof depicts a change in the flow rate of the gaseous fuel supplied to the inner fuel nozzles 21 and the nozzle groups of the outer fuel nozzles 22 and 23 along with burner schematic diagrams.

Stop procedures according to the present embodiment are similar to those according to the first embodiment except that the procedure (7) in the four procedures (5) to (8) described in the first embodiment is divided into three stages of procedures (7a), (7b), and (7c). In the present embodiment, the procedures (5), (6), and (8) are similar to those according to the first embodiment and description thereof is, therefore, omitted, and the procedures (7c), (7b), and (7a) will be described hereinafter. Upon completion of the procedures (5) and (6), the following procedures (7c), (7b), and (7a) are executed in a sequential order. Upon completion of the procedure (7a), the procedure (8) is executed similarly to the first embodiment. It is noted that while the three fuel control valves 66a to 66c are provided for the outer burners F2a to F2c in the present embodiment, the fuel control valves 66a to 66c are similarly controlled in the procedures (5) and (6).

Procedure (7c)

When the gas turbine load falls down to a fifth set value L5c (<L4) after execution of the procedure (6), the controller 70 outputs the signals S2, S3, S4, and S6a to S6c (FIG. 7) to the fuel shut valves 62 and 63 and the fuel control valves 64 and 66a to 66c to execute the procedure (7c). In the procedure (7c), the controller 70 lowers the opening degree of the fuel control valve 66c down to zero at, for example, a specified increasing rate while maintaining the opening degrees of the fuel control valves 64, 66a, and 66b in the state of releasing the fuel shut valves 62 and 63. The injection quantity of the main fuel f2 from the outer burner F2c thereby decreases and the gas turbine load falls in a state of maintaining the injection quantity of the startup fuel f1 from the inner burner F1 and injection quantities of the main fuel f2 from the outer burners F2a and F2b. During this time, the fuel control valve 65 is closed and the supply of the main fuel f2 to the fuel nozzles 21 of the inner burner F1 is stopped. In the case of operator's regulating the fuel flow rates, the operator manually operates the opening degrees of the fuel shut valves 62 and 63 and the fuel control valves 64 to 66 using the operation device (not depicted) as described above.

Procedure (7b)

When the gas turbine load falls down to a set value L5b (<L5c), the controller 70 outputs the signals S2, S3, S4, S6a, and S6b (FIG. 7) to the fuel shut valves 62 and 63 and the fuel control valves 64, 66a, and 66b to execute the procedure (7b). In the procedure (7b), the controller 70 lowers the opening degree of the fuel control valve 66b down to zero at, for example, a specified increasing rate while maintaining the opening degrees of the fuel control valves 64 and 66a in the state of releasing the fuel shut valves 62 and 63. The injection quantity of the main fuel f2 from the outer burner F2b thereby decreases and the gas turbine load further falls in a state of maintaining the injection quantity of the startup fuel f1 from the inner burner F1 and the injection quantity of the main fuel f2 from the outer burner F2a. During this time, the controller 70 leaves the fuel control valves 65 and 66c closed. In the case of operator's regulating the fuel flow rates, the operator manually operates the opening degrees of the fuel shut valves 62 and 63 and the fuel control valves 64 to 66 using the operation device (not depicted) as described above.

Procedure (7a)

When the gas turbine load falls down to a set value L5a (L6<L5a<L5b), the controller 70 outputs the signals S2, S3, S4, and S6a (FIG. 7) to the fuel shut valves 62 and 63 and the fuel control valves 64 and 66a to execute the procedure (7a). In the procedure (7a), the controller 70 lowers the opening degree of the fuel control valve 66a down to zero at, for example, a specified increasing rate while maintaining the opening degree of the fuel control valves 64 in the state of releasing the fuel shut valves 62 and 63. The injection quantity of the main fuel f2 from the outer burner F2a thereby decreases and the gas turbine load further falls in a state of maintaining the injection quantity of the startup fuel f1 from the inner burner F1. During this time, the controller 70 leaves the fuel control valves 65, 66b, and 66c closed. In the case of operator's regulating the fuel flow rates, the operator manually operates the opening degrees of the fuel shut valves 62 and 63 and the fuel control valves 64 to 66 using the operation device (not depicted) as described above.

—Advantages—

The present embodiment can obtain similar advantages to those of the first embodiment. Furthermore, dividing the outer fuel nozzles 22 and 23 into the plurality of nozzle groups, and executing start and stop of the supply of the main fuel f2 per nozzle group to perform the ignition of the main fuel f2 and the like stepwise make it possible to further ensure suppression of the emission of the unburned main fuel f2.

Fourth Embodiment

—Configurations—

Figure 11:
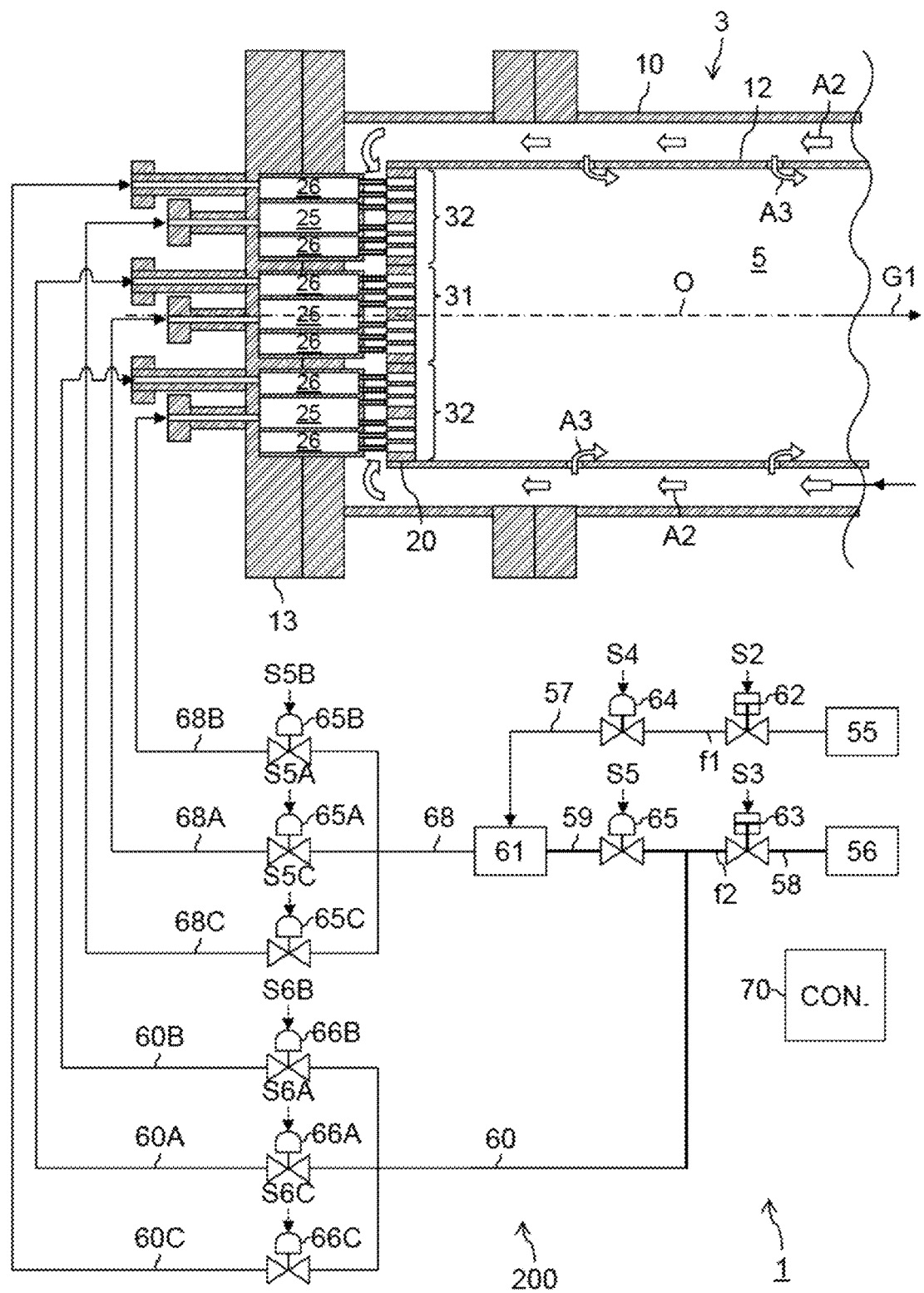
FIG. 11 is a schematic configuration diagram of a gas turbine plant configured with a gas turbine combustor according to a fourth embodiment of the present invention.
Figure 12:
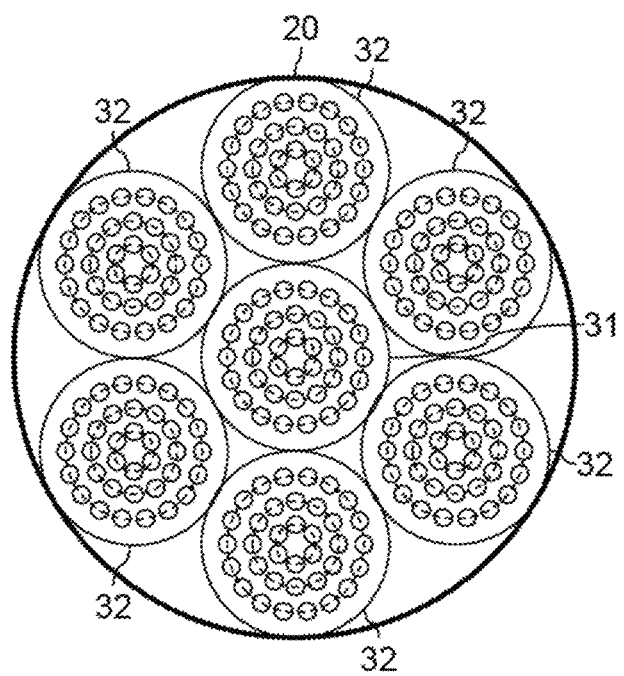
FIG. 12 depicts a burner provided in the gas turbine combustor according to the fourth embodiment of the present invention, the burner being viewed from a combustion chamber.

FIG. 11 is a schematic configuration diagram of a gas turbine plant configured with a gas turbine combustor according to a fourth embodiment of the present invention. FIG. 12 depicts a burner provided in the gas turbine combustor according to the fourth embodiment of the present invention, the burner being viewed from a combustion chamber. FIGS. 11 and 12 correspond to FIGS. 1 and 2 of the first embodiment. In FIGS. 11 and 12, similar elements to those in the first embodiment are denoted by the same reference characters as those in FIGS. 1 and 2 and description thereof is omitted. The present embodiment differs from the first embodiment in that the combustor 3 is configured with a multi-burner configured with a plurality of burners.

The combustor 3 according to the present embodiment is configured with a pilot burner 31 and a plurality of (six in the present embodiment) main burners 32, and the pilot burner 31 and the main burners 32 are disposed in such a manner that surroundings of one pilot burner 31 disposed at a center are surrounded by the plurality of main burners 32. In the present embodiment, a case of applying a burner structure according to the first embodiment to each of the pilot burner 31 and the main burners 32 is exemplarily illustrated. It is to be noted that the burner 8 according to the first, second, or third embodiment can be applied to each of the pilot burner 31 and the main burners 32 as appropriate. For example, the burner 8 according to any of the first to third embodiments can be uniformly used as each of the pilot burner 31 and the main burners 32, or a mixture of the burners 8 according to the first to third embodiments can be used as the pilot burner 31 and the main burners 32 as appropriate. The air hole plate 20 can be shared among the pilot burner 31 and the plurality of main burners 32 (the air holes 51 to 53 of each burner can be formed in one air hole plate 20).

As for the fuel supplying system 200, the communication duct 68 branches off to a plurality of (three in the present embodiment) branch pipes 68A to 68C. The branch pipe 68A is connected to the inner fuel nozzles 21 (fuel cavity 25) of the pilot burner 31. The branch pipe 68B is connected to the inner fuel nozzles 21 (fuel cavities 25) of half of the main burners 32, and the branch pipe 68C is connected to the inner fuel nozzles 21 (fuel cavities 25) of the remaining main burners 32. Furthermore, a fuel control valve 65A is provided in the branch pipe 68A, a fuel control valve 65B is provided in the branch pipe 68B, and a fuel control valve 65C is provided in the branch pipe 68C. The fuel control valves 65A to 65C are identical to, for example, the fuel control valve 65.

Moreover, in the present embodiment, the main fuel pipe 60 branches off to a plurality of (three in the present embodiment) branch pipes 60A to 60C. The branch pipe 60A is connected to the outer fuel nozzles 22 and 23 (fuel cavity 26) of the pilot burner 31. The branch pipe 60B is connected to the outer fuel nozzles 22 and 23 (fuel cavities 26) of half of the main burners 32, and the branch pipe 60C is connected to the outer fuel nozzles 22 and 23 (fuel cavities 26) of the remaining main burners 32. A fuel control valve is not provided in the main fuel pipe 60 (portion before branching off to the branch pipes 60A to 60C). In the present embodiment, a fuel control valve 66A is provided in the branch pipe 60A, a fuel control valve 66B is provided in the branch pipe 60B, and a fuel control valve 66C is provided in the branch pipe 60C. The fuel control valves 66A to 66C are identical to the fuel control valve 66 according to the first embodiment.

The present embodiment is similar to the first, second, or third embodiment in other respects.

—Operations—

Figure 13:
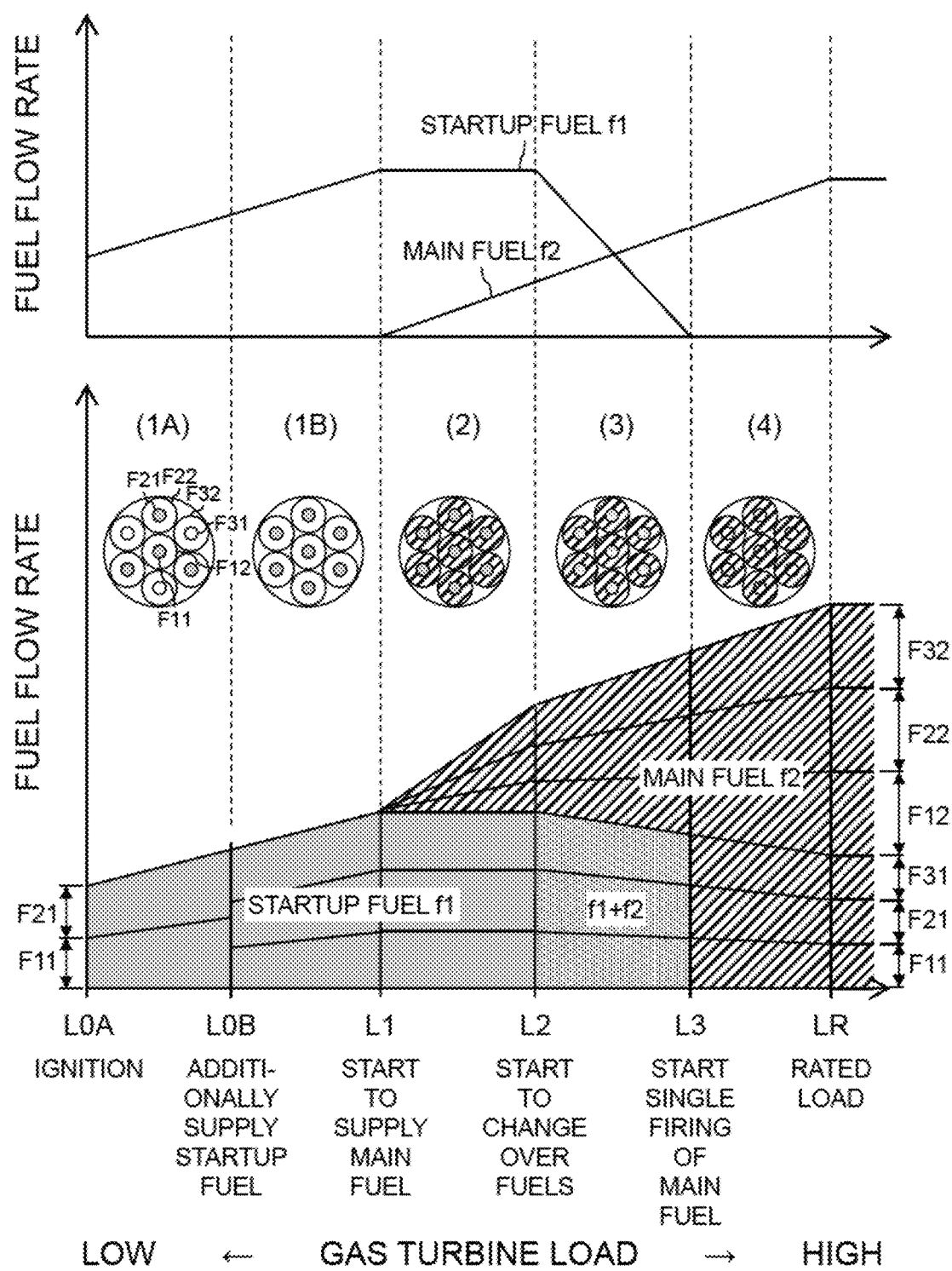
FIG. 13 is an explanatory diagram of a gas turbine combustor operating method (startup time) according to the fourth embodiment of the present invention.

FIG. 13 is an explanatory diagram of a combustor operating method (startup time) according to the fourth embodiment. FIG. 13 corresponds to FIG. 3 according to the first embodiment. An example of the operating method at the startup time since ignition of the startup fuel f1 until transition to the state of the single firing of the main fuel f2 will be described with reference to FIG. 13. In FIG. 13, a horizontal axis represents the gas turbine load and the gas turbine load is heavier as being closer to a right side. Furthermore, an upper row of FIG. 13 depicts changes in the flow rates of the startup fuel f1 and the main fuel f2, and a lower row thereof depicts a change in the flow rate of the gaseous fuel supplied to the inner fuel nozzles 21 and the outer fuel nozzles 22 and 23 of the pilot burner 31 and the main burners 32 along with burner schematic diagrams. An inner burner F11 depicted in the burner schematic diagrams is an inner burner (corresponding to the fuel nozzles 21) of the pilot burner 31, and an outer burner F12 is an outer burner (corresponding to the fuel nozzles 22 and 23) of the pilot burner 31. In addition, as for the main burners 32, it is assumed that three alternate main burners 32 in the circumferential direction belong to a first group and that the remaining three main burners 32 belong to a second group. An inner burner F21 is an inner burner (corresponding to the fuel nozzles 21) of the main burners 32 in the first group, and an outer burner F22 is an outer burner (corresponding to the fuel nozzles 22 and 23) of the main burners 32 in the first group. An inner burner F31 is an inner burner (corresponding to the fuel nozzles 21) of the main burners 32 in the second group, and an outer burner F32 is an outer burner (corresponding to the fuel nozzles 22 and 23) of the main burners 32 in the second group.

Startup procedures according to the present embodiment are similar to those according to the first embodiment except that the procedure (1) in the four procedures (1) to (4) described in the first embodiment is divided into two stages of procedures (1A) and (1B). The procedures (1A) and (1B) will be described hereinafter. Upon completion of the following procedures (1A) and (1B), the procedures (2) to (4) are executed similarly to the first embodiment. It is noted that while the three fuel control valves 65A to 65C are provided for the startup fuel f1 in the present embodiment, the fuel control valves 65A to 65C are similarly controlled in the procedures (2) to (4). Likewise, while the three fuel control valves 66A to 66C are provided for the main fuel f2, the fuel control valves 66A to 66C are similarly controlled in the procedures (2) to (4).

Procedure (1A)

The startup motor 7 starts to rotate the gas turbine rotor, and the controller 70 executes the procedure (1A) when the gas turbine load rises up to a set value L0A that satisfies an ignitable condition. In the procedure (1A), the controller 70 outputs signals S2, S4, S5A, and S5B (FIG. 11) to the fuel shut valve 62 and the fuel control valves 64, 65A, and 65B, and releases the fuel shut valve 62 and opens the fuel control valves 64, 65A, and 65B to raise the opening degrees of the fuel control valves 64, 65A, and 65B at, for example, a specified increasing rate. The startup fuel f1 is thereby jetted from the inner burners F11 and F21 and ignited, the startup fuel f1 increases at a predetermined increasing rate, and the gas turbine load rises. During this time, the controller 70 leaves the fuel shut valve 63 and the fuel control valves 65, 65C and 66A to 66C closed. In the case of operator's regulating the fuel flow rates, the operator manually operates the opening degrees of the fuel shut valves 62 and 63 and the fuel control valves 64, 65, 65A to 65C, and 66A to 66C using the operation device (not depicted) as described above.

Procedure (1B)

When the gas turbine load rises up to a set value L0B (L0A<L0B<L1), the controller 70 executes the procedure (1B). In the procedure (1B), the controller 70 outputs signals S2, S4, and S5A to S5C (FIG. 11) to the fuel shut valve 62 and the fuel control valves 64 and 65A to 65C, newly opens the fuel control valve 65C, and raises the opening degrees of the fuel control valves 64 and 65A to 65C at, for example, a specified increasing rate. The startup fuel f1 is thereby jetted from the inner burners F11 to F31, the startup fuel f1 increases at a predetermined increasing rate, and the gas turbine load rises. During this time, the controller 70 leaves the fuel shut valve 63 and the fuel control valves 65 and 66A to 66C closed. In the case of operator's regulating the fuel flow rates, the operator manually operates the opening degrees of the fuel shut valves 62 and 63 and the fuel control valves 64, 65, 65A to 65C, and 66A to 66C using the operation device (not depicted) as described above.

Figure 14:
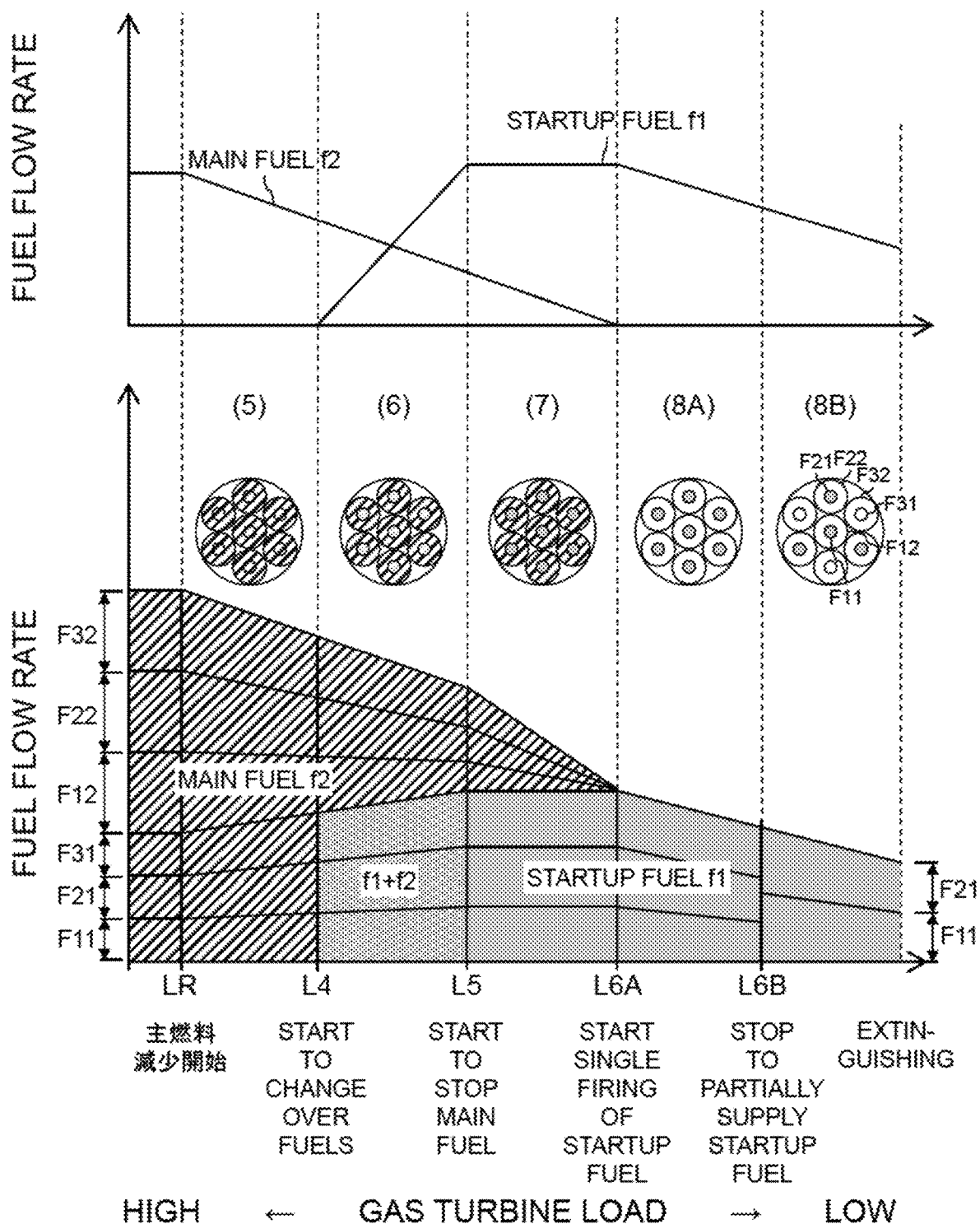
FIG. 14 is an explanatory diagram of a gas turbine combustor operating method (stop time) according to the fourth embodiment of the present invention.

FIG. 14 is an explanatory diagram of a combustor operating method (stop time) according to the fourth embodiment. FIG. 14 corresponds to FIG. 4 according to the first embodiment. An example of the operating method at the stop time since the rated load until extinguishing will be described with reference to FIG. 14. In FIG. 14, a horizontal axis represents the gas turbine load and the gas turbine load is lighter as being closer to a right side. Furthermore, an upper row of FIG. 14 depicts changes in the flow rates of the startup fuel f1 and the main fuel f2, and a lower row thereof depicts a change in the flow rate of the gaseous fuel supplied to the inner fuel nozzles 21 and the outer fuel nozzles 22 and 23 of the pilot burner 31 and the main burners 32 along with burner schematic diagrams.

Stop procedures according to the present embodiment are similar to those according to the first embodiment except that the procedure (8) in the four procedures (5) to (8) described in the first embodiment is divided into two stages of procedures (8A) and (8B). The procedures (8A) and (8B) will be described hereinafter. Similarly to the first embodiment, upon execution of the procedures (5) to (7), the following procedures (8A) and (8B) are executed. It is noted that while the three fuel control valves 65A to 65C are provided for the startup fuel f1 in the present embodiment, the fuel control valves 65A to 65C are similarly controlled in the procedures (5) to (7). Likewise, while the three fuel control valves 66A to 66C are provided for the main fuel f2, the fuel control valves 66A to 66C are similarly controlled in the procedures (5) to (7).

Procedure (8A)

When the gas turbine load falls down to a sixth set value L6A (<L5) after execution of the procedure (7), the controller 70 outputs the signals S2, S4, and S5A to S5C (FIG. 11) to the fuel shut valve 62 and the fuel control valves 64 and 65A to 65C to execute the procedure (8A). In the procedure (8A), the controller 70 lowers the opening degrees of the fuel control valves 64 and 65A to 65C at, for example, a specified increasing rate in the state of releasing the fuel shut valve 62. During this time, the fuel shut valve 63 and the fuel control valves 65 and 66A to 66C are closed and the firing state is the state of the single firing of the startup fuel f1. In the case of operator's regulating the fuel flow rates, the operator manually operates the opening degrees of the fuel shut valves 62 and 63 and the fuel control valves 64, 65, 65A to 65C, and 66A to 66C using the operation device (not depicted) as described above.

Procedure (8B)

When the gas turbine load falls down to a set value L6B (<L6A), the controller 70 outputs the signals S2, S4, S5A, and S5B (FIG. 11) to the fuel shut valve 62 and the fuel control valves 64, 65A, and 65B to execute the procedure (8B). In the procedure (8B), the controller 70 lowers the opening degrees of the fuel control valves 64, 65A, and 65B down to zero at, for example, a specified increasing rate in the state of releasing the fuel shut valve 62. In the course, the combustor 3 is extinguished and the stop operation is over. During this time, the fuel shut valve 63 and the fuel control valves 65, 65C, and 66A to 66C are closed and the number of injection burners for the startup fuel f1 is reduced to two, that is, the injection burners for the startup fuel f1 are the inner burners F11 and F21. In the case of operator's regulating the fuel flow rates, the operator manually operates the opening degrees of the fuel shut valves 62 and 63 and the fuel control valves 64, 65, 65A to 65C, and 66A to 66C using the operation device (not depicted) as described above.

—Advantages—

Configuring the multi-burner by applying a burner configuration according to the first to third embodiments to the pilot burner 31 and the main burners 32 as appropriate enables the fourth embodiment to obtain similar advantages to those of the preceding embodiments or advantages as a combination of the advantages of these preceding embodiments even if the combustor 3 is used for a large-capacity gas turbine.

What is claimed is:
1. A gas turbine combustor comprising
a burner including:
    a startup fuel pipe in which a startup fuel circulates;
    a first main fuel pipe in which a main fuel circulates;
    a second main fuel pipe in which the main fuel circulates;
    a fuel mixer to which the startup fuel pipe and the first main fuel pipe are connected;
    an inner fuel nozzle to which the fuel mixer is connected;
    a plurality of outer fuel nozzles to which the second main fuel pipe is connected;
    a startup fuel control valve provided in the startup fuel pipe;
    a first fuel control valve provided in the first main fuel pipe; and
    a second fuel control valve provided in the second main fuel pipe,
the gas turbine combustor further comprising:
a cylindrical liner that forms a combustion chamber; and
an air hole plate disposed at an inlet port of the cylindrical liner and including a plurality of air holes that guide compressed air to the combustion chamber, wherein
    the inner fuel nozzle and the plurality of outer fuel nozzles have injection ports oriented to the corresponding air holes, and are disposed opposite to the combustion chamber across the air hole plate, and
    the inner fuel nozzle and the plurality of outer fuel nozzles are disposed concentrically, the plurality of outer fuel nozzles are arranged around the inner fuel nozzle,
the gas turbine combustor further comprising:
a controller configured to control the startup fuel control valve, the first fuel control valve, and the second fuel control valve, wherein
    the controller executes procedures including
    raising an opening degree of the startup fuel control valve to supply the startup fuel to the inner fuel nozzle,
    raising an opening degree of the second fuel control valve to supply the main fuel to the plurality of outer fuel nozzles while supplying the startup fuel to the inner fuel nozzle when a gas turbine load rises up to a first set value, and
    raising an opening degree of the first fuel control valve to supply a mixed gaseous fuel of the startup fuel and the main fuel to the inner fuel nozzle while supplying the main fuel to the plurality of outer fuel nozzles when the gas turbine load further rises up to a second set value.

2. The gas turbine combustor according to claim 1, wherein
the controller executes procedures including
closing the first fuel control valve to stop the supply of the main fuel to the inner fuel nozzle, and lowering the opening degree of the second fuel control valve at a specified increasing rate when the opening degree of the second fuel control valve is lowered and the gas turbine load falls down to a third set value, and
closing the second fuel control valve to transition to a state of single firing of the startup fuel, and subsequently lowering the opening degree of the startup fuel control valve down to zero to extinguish the startup fuel when the gas turbine load further falls down to a fourth set value.

3. The gas turbine combustor according to claim 1, wherein
the controller executes procedures including
closing the startup fuel control valve to stop the supply of the startup fuel to the inner fuel nozzle, and transitioning to a state of single firing of the main fuel, the state of single firing being a state in which only the main fuel is jetted from all of the plurality of outer fuel nozzles and the inner fuel nozzle, when the gas turbine load further rises up to a third set value.

4. The gas turbine combustor according to claim 3, wherein
the controller executes procedures including
lowering the opening degree of the second fuel control valve,
raising the opening degree of the startup fuel control valve to supply the mixed gaseous fuel of the startup fuel and the main fuel to the inner fuel nozzle when the gas turbine load falls down to a fourth set value,
closing the first fuel control valve to stop the supply of the main fuel to the inner fuel nozzle, and lowering the opening degree of the second fuel control valve when the gas turbine load further falls down to a fifth set value, and
closing the second fuel control valve to transition to a state of single firing of the startup fuel, and subsequently lowering the opening degree of the startup fuel control valve down to zero to extinguish the startup fuel when the gas turbine load further falls down to a sixth set value.

5. The gas turbine combustor according to claim 4, wherein
the second set value is greater than the first set value,
the third set value is greater than the second set value,
a rated load is greater than the third set value,
the fourth set value is less than the rated load,
the fifth set value is less than the fourth set value, and
the sixth set value is less than the fifth set value.

6. The gas turbine combustor according to claim 1, wherein
the plurality of outer fuel nozzles are divided into a plurality of nozzle groups, the second main fuel pipe branches off to a plurality of branch pipes, and the plurality of branch pipes are each connected to a corresponding nozzle group.

7. The gas turbine combustor according to claim 1, further comprising:
a plurality of burners.

8. The gas turbine combustor according to claim 1, further comprising:
a cylindrical liner that forms a combustion chamber; and
an air hole plate disposed at an inlet port of the cylindrical liner and including a plurality of air holes that guide compressed air to the combustion chamber, wherein
the inner fuel nozzle and the plurality of outer fuel nozzles have injection ports, and the injection ports are open to inner wall surfaces of the air holes.

9. The gas turbine combustor according to claim 1, wherein
the startup fuel is either natural gas or petroleum gas, and the main fuel is a hydrogen content fuel.

10. A gas turbine combustor operating method using the gas turbine combustor according to claim 1, comprising:
raising an opening degree of the startup fuel control valve to supply the startup fuel to the inner fuel nozzle;
raising an opening degree of the second fuel control valve to supply the main fuel to the plurality of outer fuel nozzles when a gas turbine load rises up to a first set value; and
raising an opening degree of the first fuel control valve to supply a mixed gaseous fuel of the startup fuel and the main fuel to the inner fuel nozzle when the gas turbine load further rises up to a second set value.

11. The gas turbine combustor operating method according to claim 10, further comprising:
closing the first fuel control valve to stop the supply of the main fuel to the inner fuel nozzle, and lowering the opening degree of the second fuel control valve at a specified increasing rate when the opening degree of the second fuel control valve is lowered and the gas turbine load falls down to a third set value; and
closing the second fuel control valve to transition to a state of single firing of the startup fuel, and subsequently lowering the opening degree of the startup fuel control valve down to zero to extinguish the startup fuel when the gas turbine load further falls down to a fourth set value.

12. The gas turbine combustor operating method according to claim 10, further comprising:
closing the startup fuel control valve to stop the supply of the startup fuel to the inner fuel nozzle, and transitioning to a state of single firing of the main fuel, the state of single firing being a state in which only the main fuel is jetted from all of the plurality of outer fuel nozzles and the inner fuel nozzle, when the gas turbine load further rises up to a third set value.

13. The gas turbine combustor operating method according to claim 12, further comprising:
lowering the opening degree of the second fuel control valve;
raising the opening degree of the startup fuel control valve to supply the mixed gaseous fuel of the startup fuel and the main fuel to the inner fuel nozzle when the gas turbine load falls down to a fourth set value;
closing the first fuel control valve to stop the supply of the main fuel to the inner fuel nozzle, and lowering the opening degree of the second fuel control valve when the gas turbine load further falls down to a fifth set value; and
closing the second fuel control valve to transition to a state of single firing of the startup fuel, and subsequently lowering the opening degree of the startup fuel control valve down to zero to extinguish the startup fuel when the gas turbine load further falls down to a sixth set value.

14. The gas turbine combustor according to claim 13, wherein the second set value is greater than the first set value,
the third set value is greater than the second set value,
a rated load is greater than the third set value,
the fourth set value is less than the rated load,
the fifth set value is less than the fourth set value, and
the sixth set value is less than the fifth set value.

\* \* \* \* \*